US009321315B2

(12) United States Patent
Matsunaga et al.

(10) Patent No.: US 9,321,315 B2
(45) Date of Patent: Apr. 26, 2016

(54) TIRE HOLDING APPARATUS

(75) Inventors: Kunio Matsunaga, Hiroshima (JP);
Makoto Tachibana, Hiroshima (JP)

(73) Assignee: MITSUBISHI HEAVY INDUSTRIES MACHINERY TECHNOLOGY CORPORATION, Hiroshima-Shi, Hiroshima (JP)

( * ) Notice: Subject to any disclaimer, the term of this patent is extended or adjusted under 35 U.S.C. 154(b) by 0 days.

(21) Appl. No.: 14/387,458

(22) PCT Filed: Aug. 6, 2012

(86) PCT No.: PCT/JP2012/069966
§ 371 (c)(1),
(2), (4) Date: Sep. 23, 2014

(87) PCT Pub. No.: WO2014/024242
PCT Pub. Date: Feb. 13, 2014

(65) Prior Publication Data
US 2015/0047790 A1    Feb. 19, 2015

(51) Int. Cl.
*B60C 25/00* (2006.01)
*G01M 17/02* (2006.01)

(52) U.S. Cl.
CPC ............. *B60C 25/00* (2013.01); *G01M 17/021* (2013.01)

(58) Field of Classification Search
CPC ....... B60C 25/00; B60C 25/05; G01M 17/02; G01M 17/021; B29D 30/08
USPC .................................................... 157/14, 15
See application file for complete search history.

(56) References Cited

U.S. PATENT DOCUMENTS

| 4,574,628 | A | * | 3/1986 | Maikuma | ............ | G01M 17/021 |
| | | | | | | 73/146 |
| 4,971,128 | A | | 11/1990 | Koga et al. | | |
| 5,107,703 | A | * | 4/1992 | Ota | .................... | B29D 30/0061 |
| | | | | | | 73/146 |
| 5,737,383 | A | | 4/1998 | Noda et al. | | |
| 6,244,105 | B1 | * | 6/2001 | Nishihara | ........... | G01M 17/021 |
| | | | | | | 157/16 |
| 6,988,397 | B1 | * | 1/2006 | Delmoro | ............. | G01M 17/021 |
| | | | | | | 157/16 |
| 9,046,445 | B2 | * | 6/2015 | Ueda | .................... | G01M 17/021 |

FOREIGN PATENT DOCUMENTS

CN     1876411 A     12/2006
CN  201259469 Y      6/2009
(Continued)

OTHER PUBLICATIONS

PCT, "International Search Report for International Application No. PCT/JP2012/069966," Sep. 25, 2012.
(Continued)

*Primary Examiner* — Hadi Shakeri
(74) *Attorney, Agent, or Firm* — Manabu Kanesaka; Benjamin Hauptman; Kenneth Berner

(57) ABSTRACT

A tire holding apparatus which holds a tire using an annular rim that is detachably mounted, includes: a body section having a support surface which supports the rim; an inflation gas supply portion which has an inflation flow passage that passes from an inner portion of the body section to a center portion of the rim and supplies inflation gas into a tire supported by the rim; and a clamping portion which is mounted on the body section and clamps the rim to the support surface of the body section by using pressure of the inflation gas that flows through the inflation flow passage as a drive force.

6 Claims, 34 Drawing Sheets

(56) References Cited

FOREIGN PATENT DOCUMENTS

| | | |
|---|---|---|
| DE | 69102316 T2 | 10/1994 |
| JP | H01-192532 A | 8/1989 |
| JP | H03-047742 A | 2/1991 |
| JP | H03-110138 A | 5/1991 |
| JP | H03-231834 A | 10/1991 |
| JP | H08-118509 A | 5/1996 |
| JP | 2661753 B2 | 10/1997 |
| JP | 3040514 B2 | 5/2000 |
| JP | 2000-241300 A | 9/2000 |
| JP | 2002-350293 A | 12/2002 |
| JP | 3672135 B2 | 7/2005 |
| JP | 2006-208205 A | 8/2006 |
| JP | 2006-214865 A | 8/2006 |
| JP | 2007-171208 A | 7/2007 |
| JP | 2010-127848 A | 6/2010 |
| JP | 2011-169768 A | 9/2011 |
| JP | 2011-174839 A | 9/2011 |
| JP | 2012-010914 A | 1/2012 |
| JP | 2013-036952 A | 2/2013 |
| JP | 2013-104744 A | 5/2013 |
| JP | 2013-142681 A | 7/2013 |
| JP | 2013-142682 A | 7/2013 |
| JP | 2013-170824 A | 9/2013 |

OTHER PUBLICATIONS

PCT, "Written Opinion of the International Search Authority for International Application No. PCT/JP2012/069966," Sep. 25, 2012.

Japan Patent Office, "Notice of Allowance for JP 2014-529170," Jun. 23, 2015.

China Patent Office, "Office Action for CN 201280071858.6," Nov. 3, 2015.

German Patent Office, "Office Action for DE 112012005866.6," Nov. 11, 2015.

\* cited by examiner

TIRE HOLDING APPARATUS

RELATED APPLICATIONS

The present application is National Phase of International Application No. PCT/JP2012/069966 filed Aug. 6, 2012.

TECHNICAL FIELD

The present invention relates to a tire holding apparatus on which a tire is mounted to be tested or molded.

BACKGROUND ART

As a tire holding apparatus, for example, various testing apparatuses such as a tire uniformity measuring apparatus which measures the uniformity of a tire, and a tire balance measuring apparatus which measures the balance of a tire have been known. In a test using the tire holding apparatus, a rim assembly to which a tire as a test object is fixed is exchanged depending on the type of the tire according to the bead diameter or bead width.

In order for the tire holding apparatus to cope with many types of tires as test objects and the like, for the purpose of reducing time to exchange a rim and reducing labor for the exchanging operation, a method of automatically exchanging the rim is proposed (See PTLs 1 to 5).

Here, although not specifically described in PTLs 1 to 5, tests are performed in a state where a test rim is clamped to the body of the holding apparatus by various methods such as bolt fastening or a magnet.

CITATION LIST

Patent Literature

[PTL 1] Japanese Patent No. 2661753
[PTL 2] Japanese Unexamined Patent Application Publication No. 3-110138
[PTL 3] Japanese Unexamined Patent Application Publication No. 3-47742
[PTL 4] Japanese Unexamined Patent Application Publication No. 3-231834
[PTL 5] Japanese Patent No. 3672135

SUMMARY OF INVENTION

Technical Problem

However, generally, the rim is manually fixed. Therefore, in a case where there are a large number of types of tires as test objects, a lot of time and effort is needed. Furthermore, since the rim is installed in a rotation system, there is a need to provide a clamp portion of the rim and a drive source for driving the clamp portion in the rotation system in order to automate the clamping of the rim, and thus there is concern that the structure thereof becomes complex.

The present invention provides a tire holding apparatus capable of clamping a rim with a simple structure.

Solution to Problem

A tire holding apparatus according to a first aspect of the present invention includes: an annular rim which is detachably mounted; a body section having a support surface which supports the rim; an inflation gas supply portion which has an inflation flow passage that passes from an inner portion of the body section to a center portion of the rim supported by the support surface and supplies inflation gas into a tire supported by the rim; and a clamping portion which is mounted on the body section and clamps the rim to the support surface of the body section by using the pressure of the inflation gas that flows through the inflation flow passage as a drive force.

According to the tire holding apparatus, the rim can be clamped using the inflation gas which causes the tire to inflate. That is, without additionally providing a drive source that generates a drive force for the clamping, a pipe line through which a working fluid that transmits the drive force flows, and the like, the rim can be clamped to the support surface of the body section by the clamping portion using the pressure of the inflation gas as the drive force. Particularly, even when a rotation system is included, the new drive source, the pipe line, and the like are not additionally provided in the rotation system, thereby achieving a structure in which the rim can be easily and reliably clamped.

In addition, in a tire holding apparatus according to a second aspect of the present invention, the body section in the first aspect may include a rotating body that is provided with the support surface and rotates around a center axis and a support portion which supports the rotating body so as to be rotatable, and the clamping portion may be mounted on the rotating body.

According to the tire holding apparatus, while only providing the inflation flow passage through which the inflation gas flows from the support portion that supports the rotating body so as to be rotatable to the rotating body, it is possible for the rim to be clamped to the support surface by the clamping portion using the pressure of the inflation gas as the drive force. That is, there is no need to additionally provide the pipe line through which the working fluid that transmits the drive force between the support portion and the rotating body flows, and thus the structure in which the rim is easily and reliably clamped can be achieved.

In addition, in a tire holding apparatus according to a third aspect of the present invention, the clamping portion according to the first and second aspects may include: a piston which is mounted on the body section and is driven by the inflation gas; a hook which is mounted on the piston and clamps the rim to the support surface by pressing the rim against the support surface according to an operation of the piston; a drive pipe line which connects the piston to the inflation flow passage; and a check valve which is provided in the drive pipe line and prevents the inflation gas from flowing backward from the piston to the inflation flow passage.

By operating the piston using the inflation gas that flows through the inflation flow passage via the drive pipe line, the rim can be clamped to the support surface by the hook. In addition, even when the pressure of the inflation gas in the inflation flow passage decreases while the inflation gas is released from the tire, that is, in a state where the inflation of the tire is not performed, the clamping state of the hook is prevented by the check valve provided in the drive pipe line from being weakened or released by the backflow of the inflation gas from the piston to the inflation flow passage.

In addition, in a tire holding apparatus according to a fourth aspect of the present invention, the clamping portion in the third aspect may include an opening portion which opens an inner portion of the piston so that the inflation gas filling the piston can be discharged.

Since the inflation gas filling the piston is discharged by the opening portion, the clamping state of the hook can be released from the state where the clamping state of the hook is maintained by the check valve. Therefore, the rim can be easily detached during an operation of exchanging the rim. In addition, a timing to release the clamping portion can be arbitrarily selected by the decision of a worker.

In addition, in a tire holding apparatus according to a fifth aspect of the present invention, the opening portion in the fourth aspect may include an opening valve and a drive portion which drives the opening valve.

Since the opening valve is driven by the drive portion, the clamping state of the hook can be released, and the automation of the detaching of the rim during the operation of exchanging the rim can be achieved, thereby increasing the efficiency of the operation. In addition, the drive portion may be disposed in any section of the rotating body on the rotating side and the support portion on the fixed side.

In addition, in a tire holding apparatus according to a sixth aspect of the present invention, the hook in the third to fifth aspects may be mounted on a center portion in a direction perpendicular to an operation direction of the piston.

Since the hook is mounted, efficiency in transmitting a force applied from the piston during the operation of the piston can be improved.

In addition, in a tire holding apparatus according to a seventh aspect of the present invention, the hook in the third to sixth aspects may include a roller at a position where the rim is pressed, and the roller may be rotatable around a direction perpendicular to a direction in which the rim is pressed against the support surface.

By the roller, the hook can be smoothly operated between the rims, resulting in improvement in reliability.

Advantageous Effects of Invention

According to the tire holding apparatus of the present invention, the rim can be clamped with the simple structure.

DESCRIPTION OF EMBODIMENTS

Hereinafter, a tire holding apparatus according to a first embodiment of the present invention will be described. In this embodiment, a case where the tire holding apparatus 1 is a tire uniformity measuring apparatus which is one type of a tire testing apparatus will be described.

Figure 1:
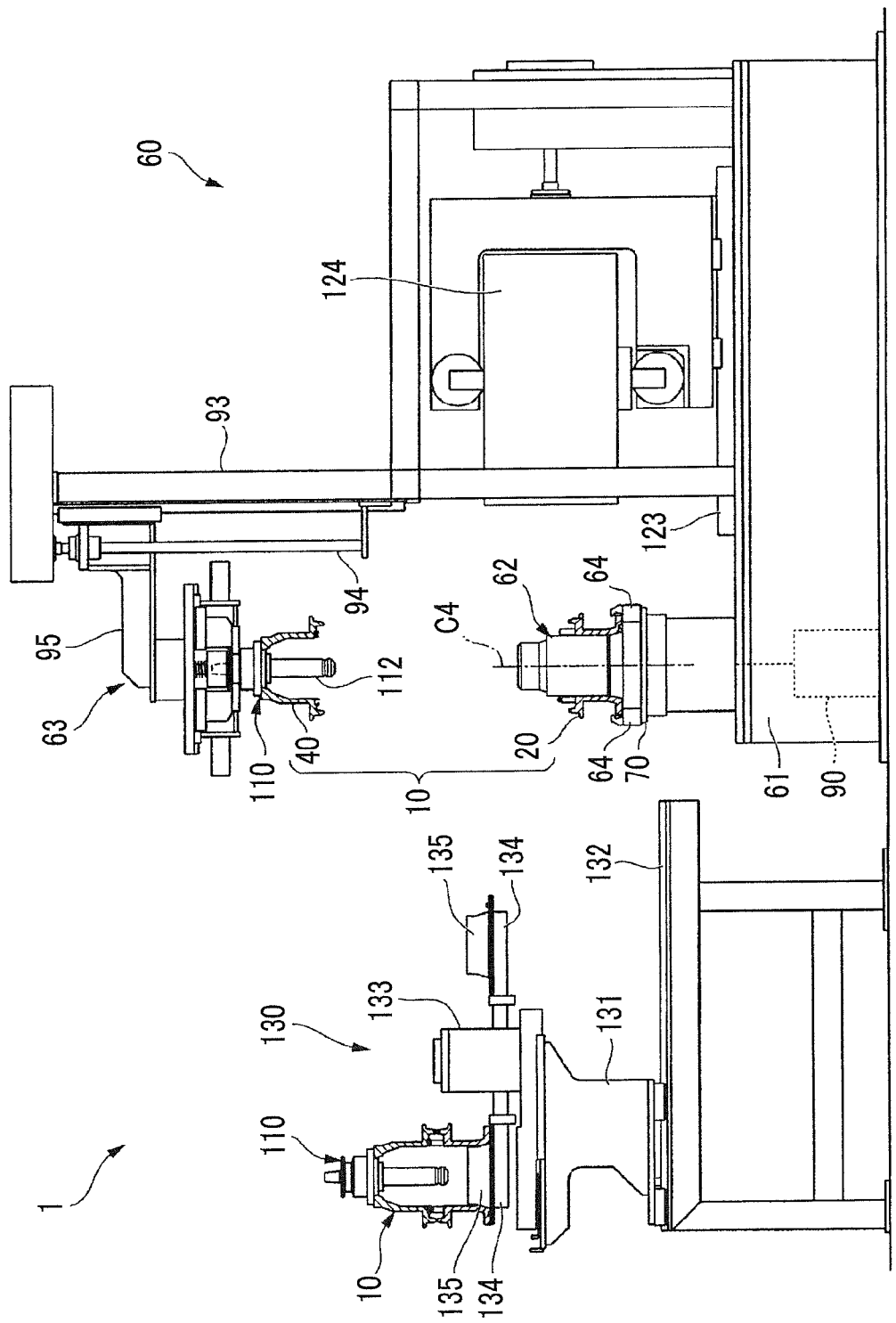
FIG. 1 is an explanatory view of a tire holding apparatus according to a first embodiment of the present invention.

As illustrated in FIG. 1, the tire holding apparatus includes a rim assembly 10 on which a tire T as a measuring object is mounted, a body unit (body section) 60 on which the rim assembly 10 is detachably mounted and which rotates the mounted rim assembly 10 around the axis thereof for measurement, and a rim exchanging unit 130 for exchanging the rim assembly 10 which is mounted on the body unit 60.

In addition, the tire holding apparatus 1 includes a fixing mechanism (clamp portion) 64 which clamps the rim assembly to the body unit 60.

The tire holding apparatus 1 includes various types of rim assemblies 10 having different outside diameters depending on the types of tires T to be measured. Hereinafter, the rim assembly 10 which is one of the types will be described.

Figure 2:
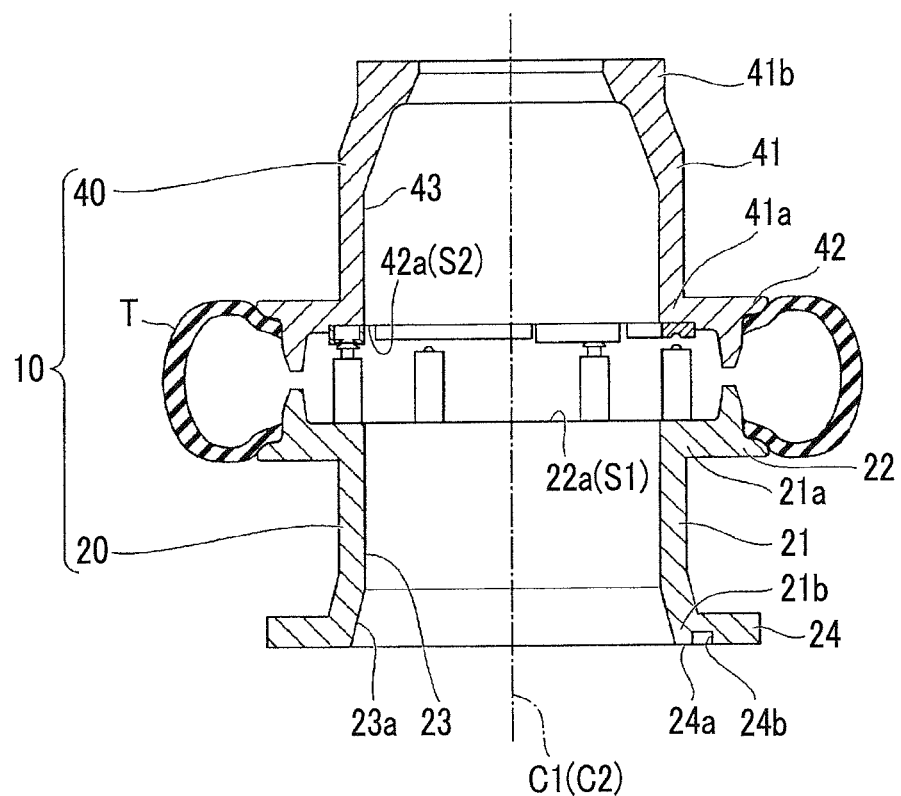
FIG. 2 is a cross-sectional view illustrating a state of a rim assembly which is mounted on a lower spindle of the tire holding apparatus.

As illustrated in FIG. 2, the rim assembly 10 includes a lower rim (rim) 20 and an upper rim 40. Both the rims 20 and 40 can be engaged with each other or disengaged from each other in a state where a first reference plane S1 set in the lower rim 20 and a second reference plane S2 set in the upper rim 40 oppose each other.

The lower rim 20 includes a body 21 which is formed in a substantially cylindrical shape and a flange portion 22 which is provided in the outer peripheral surface of one end portion 21a of the body 21, and has an annular shape overall. In this embodiment, the first reference plane S1 is set to a principal surface 22a on a side of the flange portion 22 which is separated from the other end portion 21b of the body 21.

In the body 21, a lower through-hole 23 which extends so as to be perpendicular to the first reference plane S1 is formed. On the inner peripheral surface of the end portion 21b in the lower through-hole 23, a rim side inclined surface 23a of which the diameter increases from the end portion 21a is formed. The rim side inclined surface 23a is formed in a shape of the side surface of a truncated cone.

On the outer peripheral surface of the end portion 21b of the body 21, a second flange portion 24 is provided. On a principal surface 24a on a side of the second flange portion 24 which is separated from the flange portion 22, a positioning hole portion 24b is formed.

Figure 3:
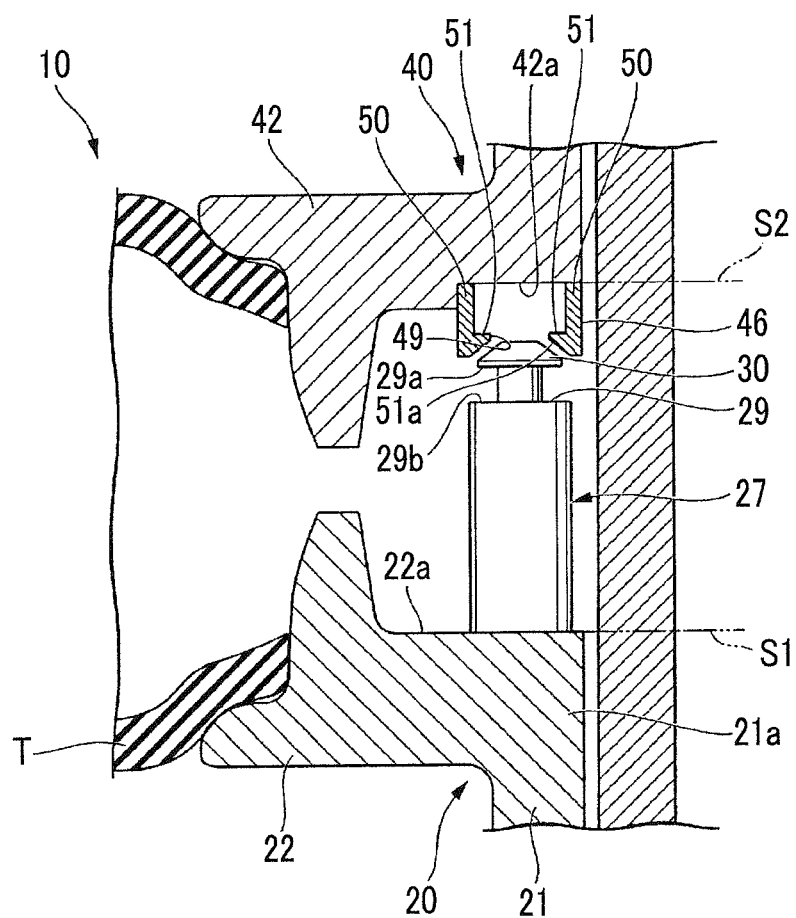
FIG. 3 is an enlarged view of main parts on a pin side of FIG. 2.
Figure 4:
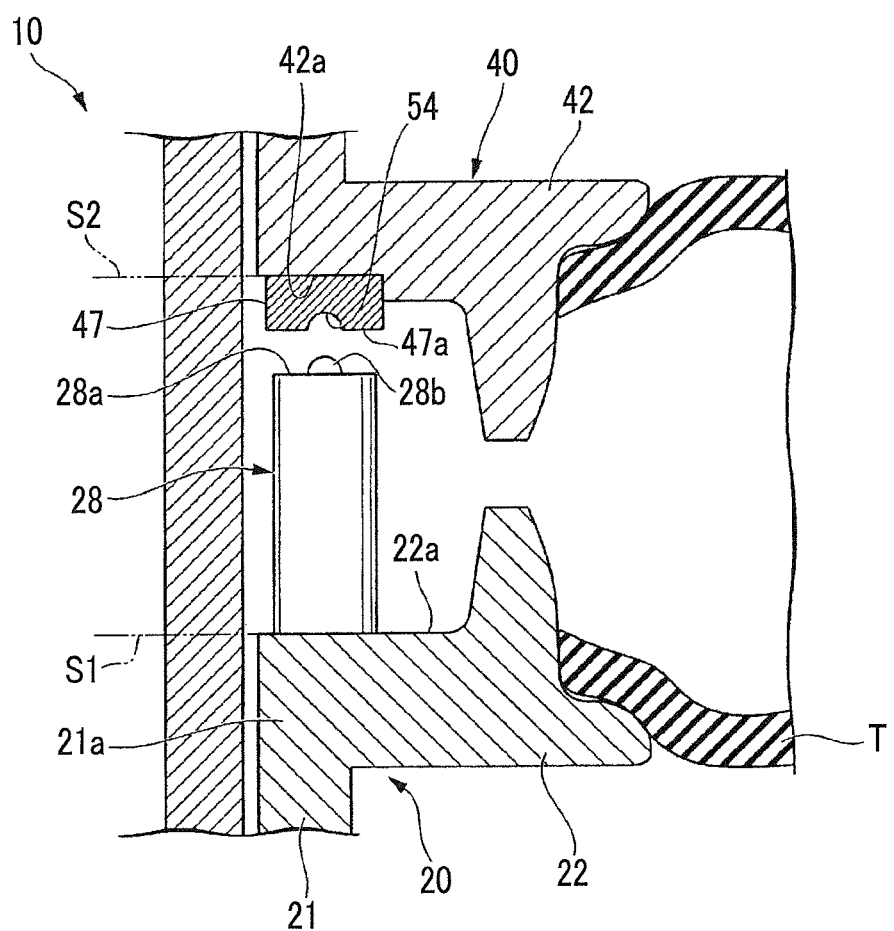
FIG. 4 is an enlarged view of main parts on a stand side of FIG. 2.
Figure 5:
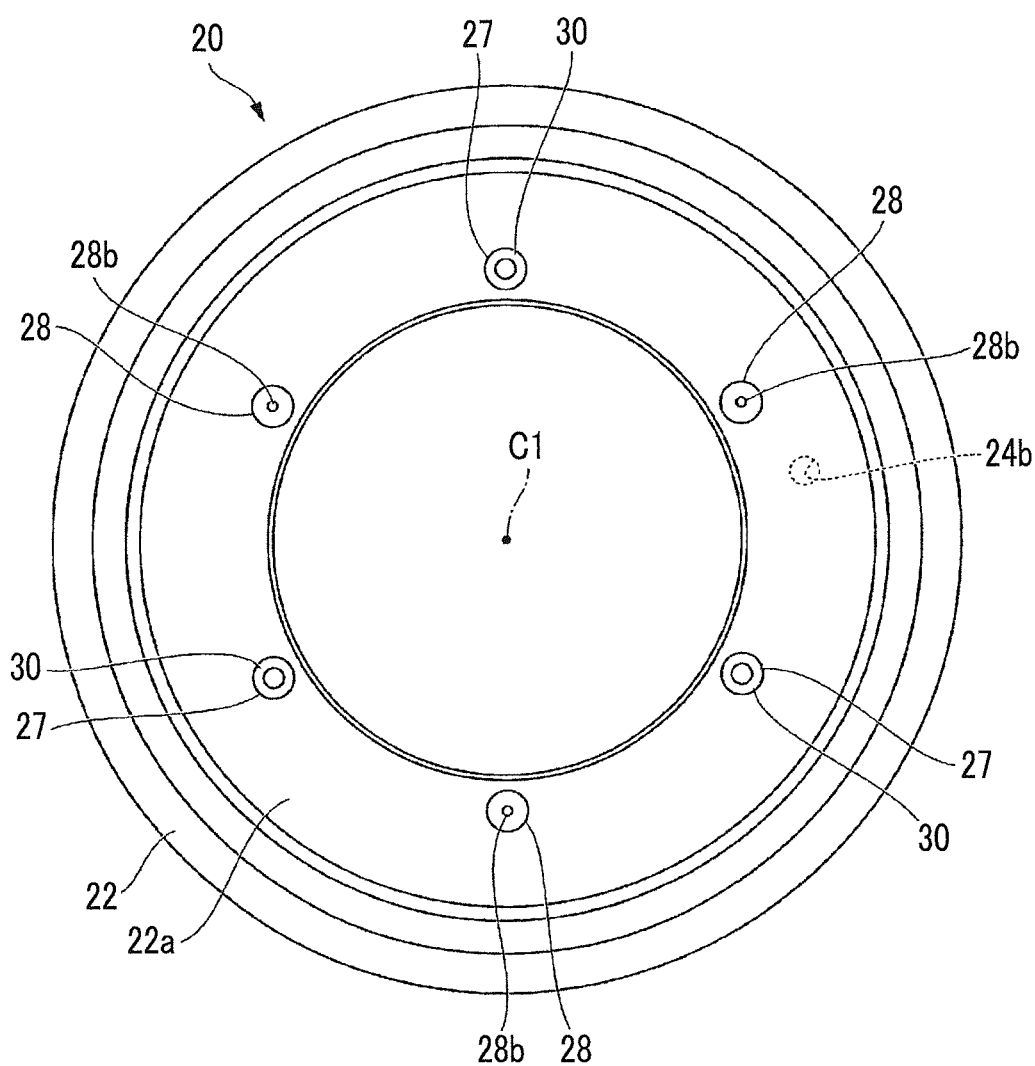
FIG. 5 is a plan view of a lower rim of the tire holding apparatus.

As illustrated in FIGS. 3 to 5, pins 27 and stands 28 are uprightly provided on the principal surface 22a of the flange portion 22. In this example, three pins 27 and three stands 28 are alternately arranged around an axis C1, and the three pins 27 and the three stands 28 are arranged around the axis C1 at equal angles.

As illustrated in FIGS. 3 and 5, the pin 27 is formed in a substantially columnar shape, and a groove portion 29 is formed over the entire outer peripheral surface on the tip end side (upper side) in the upright direction of the pin 27. A side surface 29a on the tip end side of the groove portion 29 and a side surface 29b on the base end side thereof are formed so as to be parallel to the principal surface 22a. The tip end side of the pin 27 which is located in a more upper position than the groove portion 29 is formed as a protrusion 30 having a tapered shape, of which the diameter decreases toward the tip end.

As illustrated in FIGS. 4 and 5, the stand 28 is formed in a columnar shape. On a tip end surface 28a of the stand 28, a protrusion 28b having a substantially hemispherical shape is provided so as to protrude from the tip end surface 28a.

The tire T as a measuring object is mounted closer to the edge portion side than a part of the principal surface 22a of the flange portion 22 which is provided with the pin 27 or the stand 28.

As illustrated in FIG. 2, the upper rim 40 includes a body 41 which is formed in a substantially cylindrical shape, and a flange portion 42 which is provided on the outer peripheral surface of one end portion 41a of the body 41. In this embodiment, a second reference plane S2 is set to a principal surface 42a on a side of the flange portion 42 which is separated from the other end portion 41b of the body 41.

In the body 41, an upper through-hole 43 which extends so as to be perpendicular to the second reference plane S2 is formed.

Figure 6:
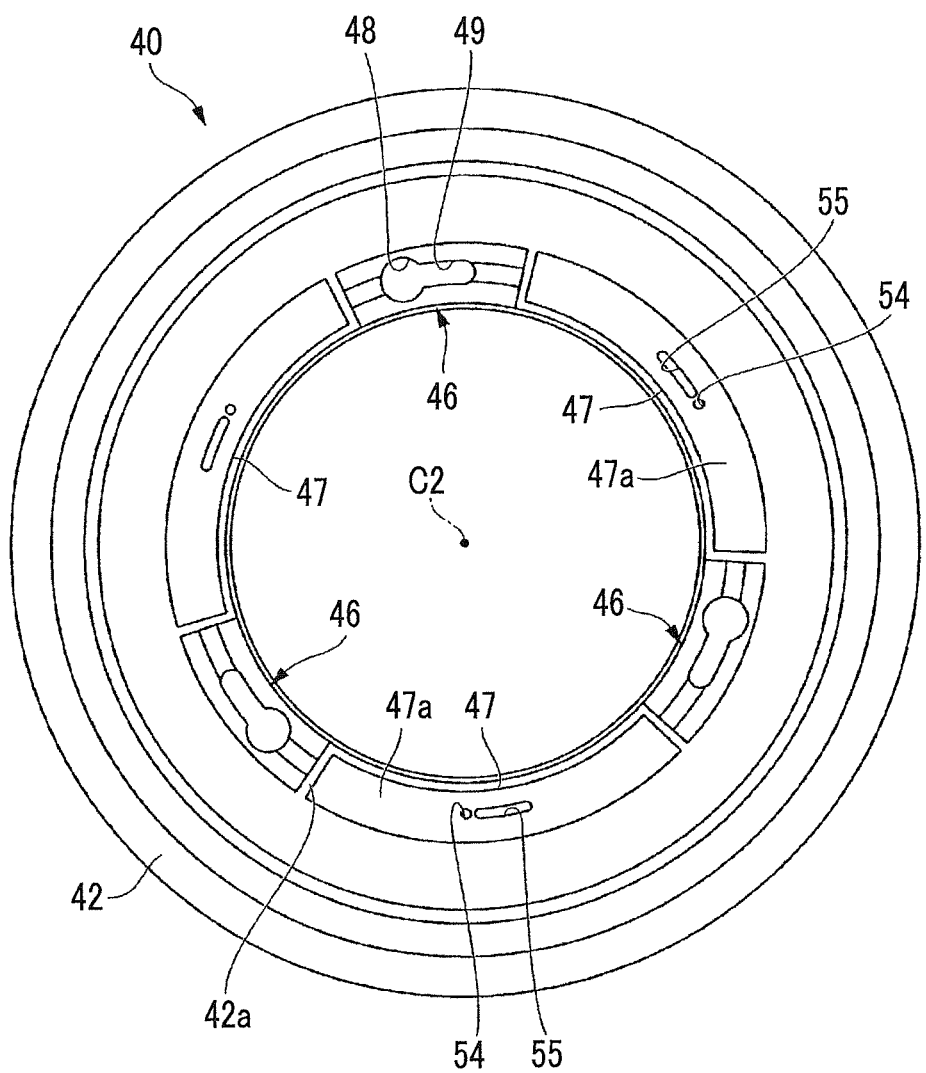
FIG. 6 is a bottom view of an upper rim of the tire holding apparatus.

As illustrated in FIGS. 3, 4, and 6, pin receiving portions 46 and stand receiving portions 47 are provided on the principal surface 42a of the flange portion 42. In this example, three pin receiving portions 46 and three stand receiving portions 47 are alternately arranged around an axis C2 of the upper rim 40, and the three pin receiving portions 46 and the three stand receiving portions 47 are arranged around the axis C2 at equal angles.

Figure 7:
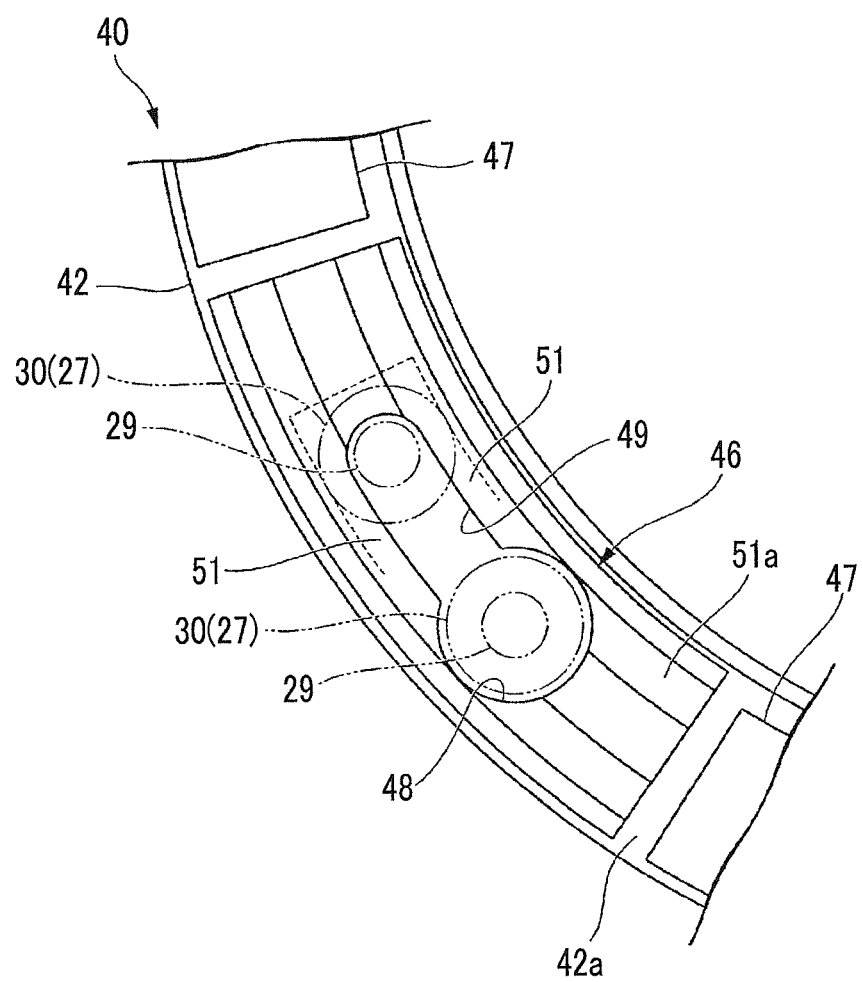
FIG. 7 is a bottom view illustrating a state in which a pin and a pin receiving portion of the tire holding apparatus are engaged with each other.

As illustrated in FIGS. 3 and 7, in the pin receiving portion 46, an insertion opening 48 and a sliding opening 49 are formed. The insertion opening 48 and sliding opening 49 communicate with each other.

The protrusion 30 of the pin 27 can enter and leave the insertion opening 48.

The sliding opening 49 is formed on one side of the insertion opening 48, and is open along the circumferential direction of the upper rim 40. The width of the sliding opening 49 is smaller than the outside diameter of the protrusion 30 of the pin 27 and is larger than the outside diameter of the groove portion 29.

Figure 8:
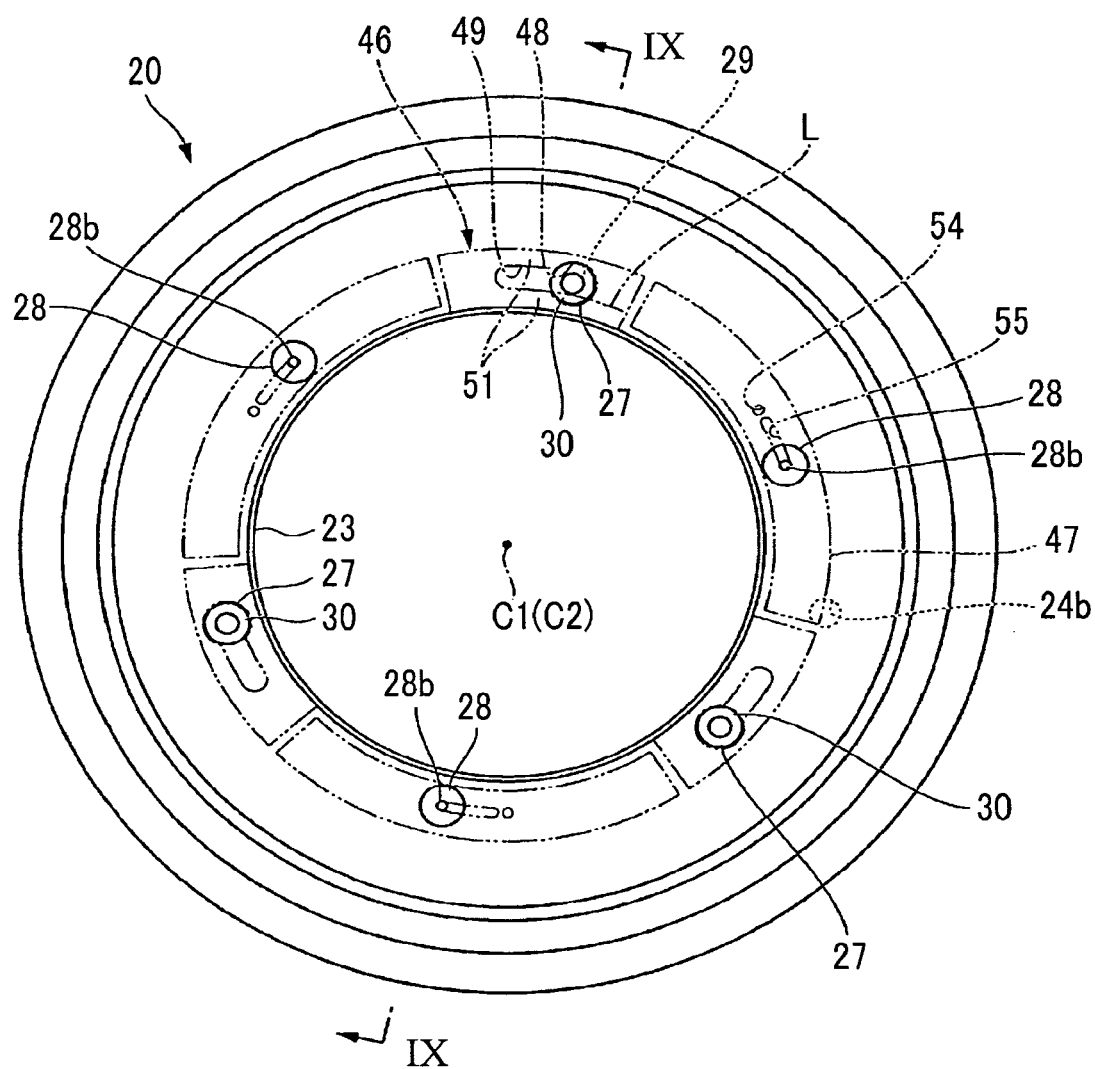
FIG. 8 is a plan view illustrating a state where the pin of the lower rim is disposed in an insertion opening of the pin receiving portion.

In the plan view illustrated in FIG. 8, the sliding opening 49 is disposed counterclockwise with respect to the insertion opening 48.

As illustrated in FIGS. 3 and 7, the pin receiving portion 46 includes a pair of wall portions 50 which are provided uprightly from the principal surface 42a so as to face each other, and protrusions 51 which are provided so as to respectively extend to the tip end portions of the wall portions 50 facing each other. The above-described sliding opening 49 is formed by a gap between the protrusions 51 which extend so as to approach each other.

Each of the wall portions 50 extends along the circumferential direction of the upper rim 40, and the gap between the wall portions 50 is larger than the outside diameter of the protrusion 30 of the pin 27. The distance from the principal surface 42a to the protrusion 51 is longer than the length of the protrusion 30. The thickness of the protrusion 51 is smaller than the distance between the side surfaces 29a and 29b of the groove portion 29 such that the protrusion 51 can be separated from any of the side surfaces 29a and 29b when the protrusion 51 is disposed in the groove portion 29.

On the surface of a side of the protrusion 51 which is separated from the principal surface 42a, a concave groove 51a having a concave shape which can accommodate the protrusion 30 of the pin 27 is formed.

As illustrated in FIG. 6, the stand receiving portion 47 is formed in an arc shape along the circumferential direction of the upper rim 40 when viewed from the bottom surface, in other words, formed so as to extend around the axis C2. As illustrated in FIG. 4, a tip end surface 47a of the stand receiving portion 47 is formed so as to be parallel to the principal surface 42a.

As illustrated in FIGS. 4 and 6, in each of the tip end surfaces 47a, a concave portion 54 and a guide concave portion 55, which can be engaged with the protrusion 28b of the stand 28 when the tip end surface 28a of the stand 28 abuts on the tip end surface 47a, are formed.

Figure 10:
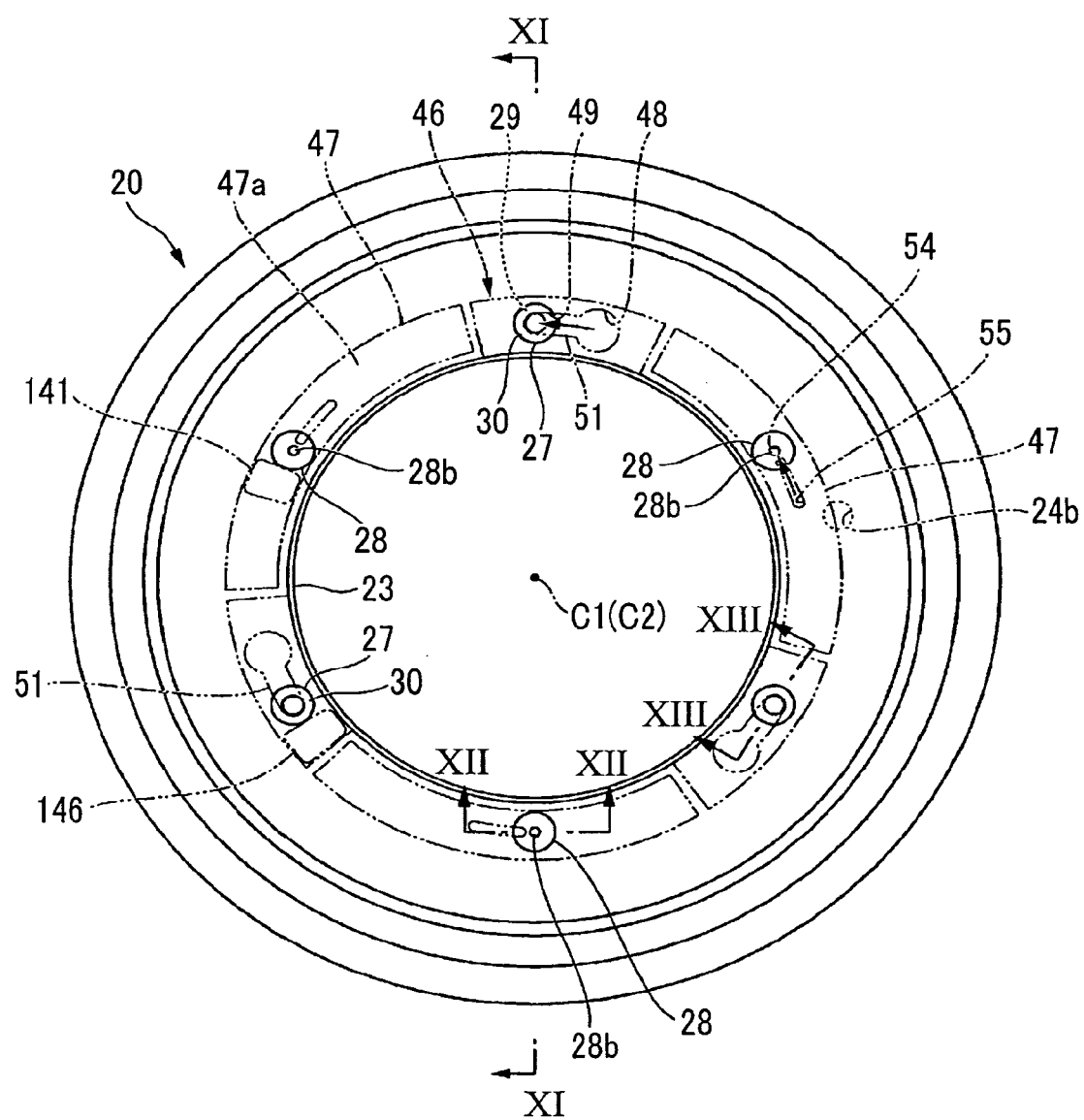
FIG. 10 is a plan view illustrating a state where a protrusion is disposed in a groove portion of the pin of the lower.rim.
Figure 11:
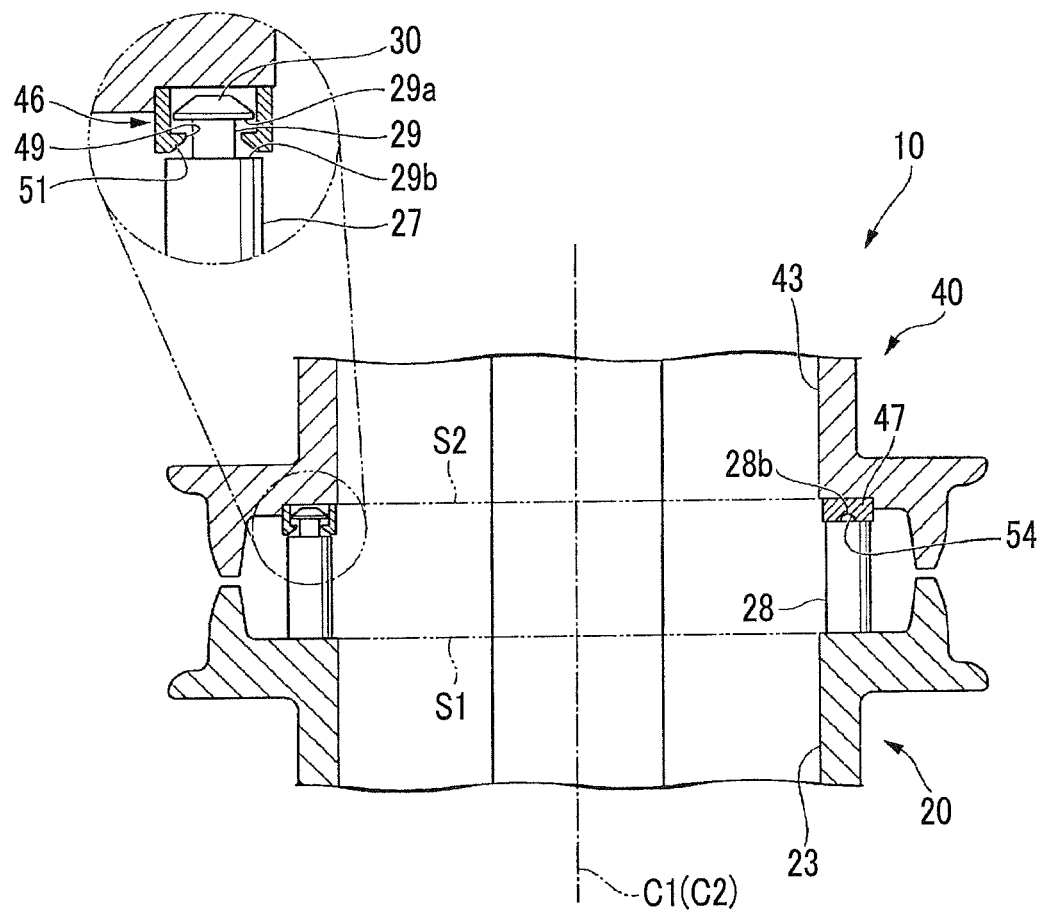
FIG. 11 is a cross-sectional view taken along line XI-XI of FIG. 10.

As illustrated in FIGS. 10 and 11, the concave portion 54 is provided at a position which opposes the protrusion 28b of the stand 28 when the protrusion 51 is disposed in the groove portion 29.

Figure 9:
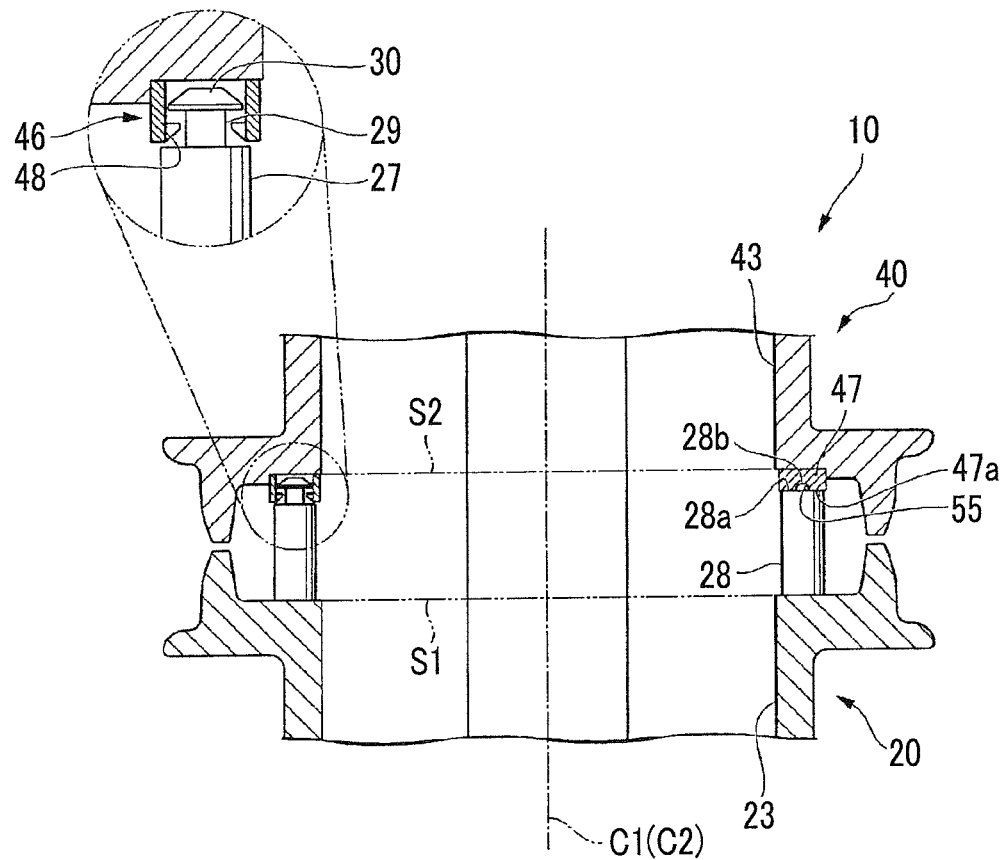
FIG. 9 is a cross-sectional view taken along line IX-IX of FIG. 8.

As illustrated in FIGS. 8 and 9, the guide concave portion 55 is formed so as to extend counterclockwise from the position which opposes the protrusion 28b when the protrusion 30 of the pin 27 is inserted into the insertion opening 48, around the axis C2 in the plane view, that is, toward the sliding opening 49 that communicates with the insertion opening 48 into which the protrusion 30 is inserted.

As illustrated in FIG. 8, when the rims 20 and 40 are viewed in the plane view so that the axes C1 and C2 overlap each other, the protrusion 28b of the stand 28, the concave portion 54, and the guide concave portion 55 are arranged in the circumference of a reference circle having the axes C1 and C2 as the origin. The concave portion 54 has a shape which is dented so as to be slightly larger than the protrusion 28b. The guide concave portion 55 has a shape in which the concave portion 54 extends around the axis C2. As illustrated in the plane view of FIG. 8, the concave portion 54 is disposed counterclockwise around the axis C2 so as to be separated from the guide concave portion 55.

The tire T as a measuring object is mounted closer to the edge portion side than a part of the principal surface 42a of the flange portion 42 which is provided with the pin receiving portion 46 or the stand receiving portion 47.

Here, an engaged state of the rim assembly 10 configured as above will be described.

When the rim assembly 10 is detached from the body unit 60 and is disposed on the rim exchanging unit 130, the lower rim 20 is disposed on the floor and the like, and the upper rim 40 which is engaged with the lower rim 20 is disposed on the lower rim 20.

In order to engage the lower rim 20 with the upper rim 40, as described below, the above-described pin 27 and the pin receiving portion 46 are engaged with each other. At this time, the stand 28 and the stand receiving portion 47 are allowed to abut on each other or to be separated from each other depending on the engaged state of the pin 27 and the pin receiving portion 46.

As illustrated in FIGS. 8 and 9, the upper rim 40 is disposed on the lower rim 20 so that the reference planes S1 and S2 oppose each other. When the protrusion 30 of the pin 27 is inserted into the insertion opening 48 and the stand 28 abuts on the stand receiving portion 47, the groove portion 29 of the pin 27 is disposed on the extending line L around the axis C2 with respect to the protrusion 51, and the protrusion 28b of the stand 28 is engaged with the guide concave portion 55 of the stand receiving portion 47. The lower through-hole 23 of the lower rim 20 and the upper through-hole 43 of the upper rim 40 are in a state of communicating with each other.

Figure 12:
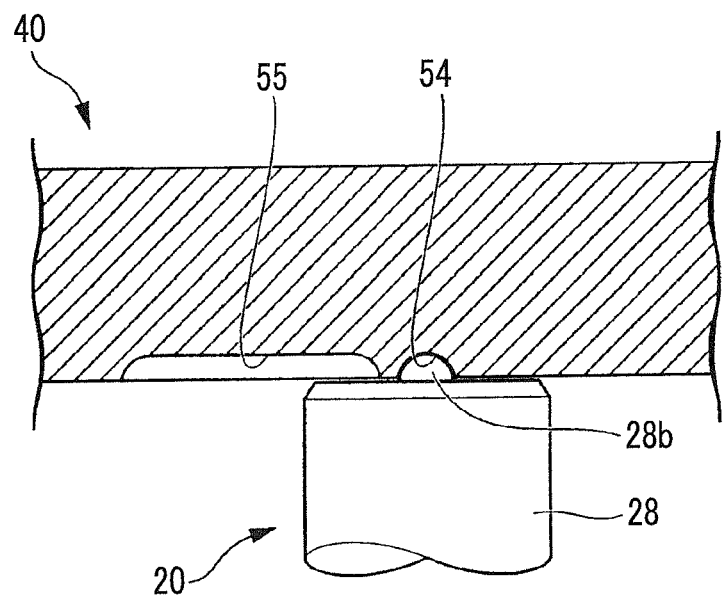
FIG. 12 is a cross-sectional view taken along line XII-XII of FIG. 10.
Figure 13:
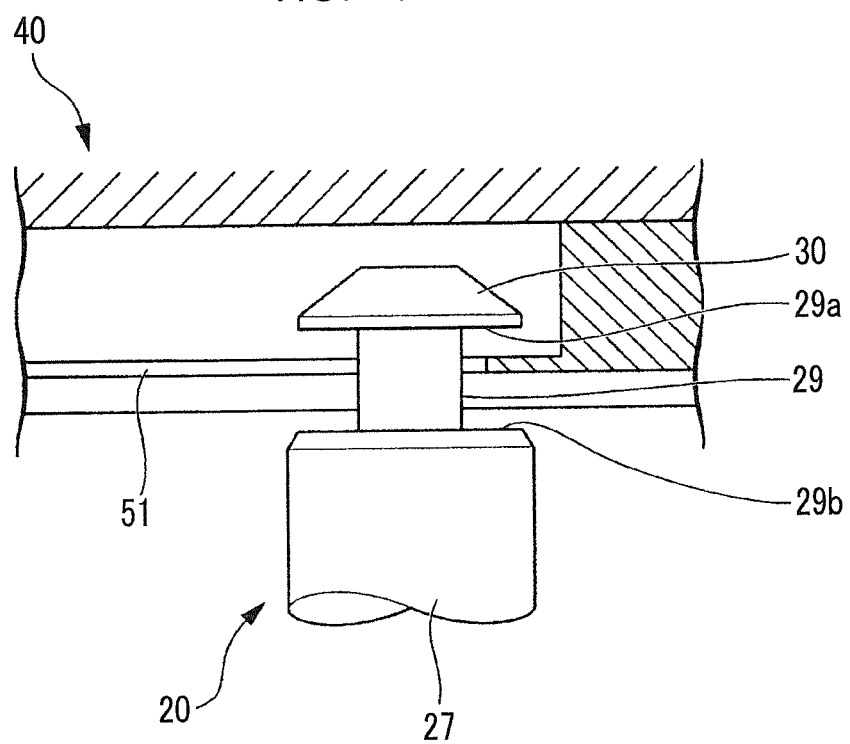
FIG. 13 is a cross-sectional view taken along line XIII-XIII of FIG. 10.

When the lower rim 20 is rotated around the axis C1 with respect to the upper rim 40 from this state, as illustrated in FIGS. 10 and 11, first, the protrusion 51 of the upper rim 40 is disposed in the groove portion 29 of the lower rim 20 while the stand 28 abuts on the stand receiving portion 47. Subsequently, the protrusion 28b is in a state of being engaged with the concave portion 54 from the state of being engaged with the guide concave portion 55 (see FIG. 12). When the protrusion 28b rides on the guide concave portion 55 to move to the concave portion 54, the upper rim 40 temporarily moves upward with respect to the lower rim 20. When the stand 28 abuts on the stand receiving portion 47, the protrusion 51 is separated from both the side surfaces 29a and 29b of the groove portion 29 (see FIG. 13).

As described above, since the stand receiving portion 47 is formed in an arc shape, even in a state where the pin 27 is inserted into the insertion opening 48 or even in a state where the protrusion 51 is disposed in the groove portion 29, the stand receiving portion 47 and the stand 28 overlap each other in the direction of the axis C1, and thus the stand 28 can abut on the stand receiving portion 47.

Figure 14:
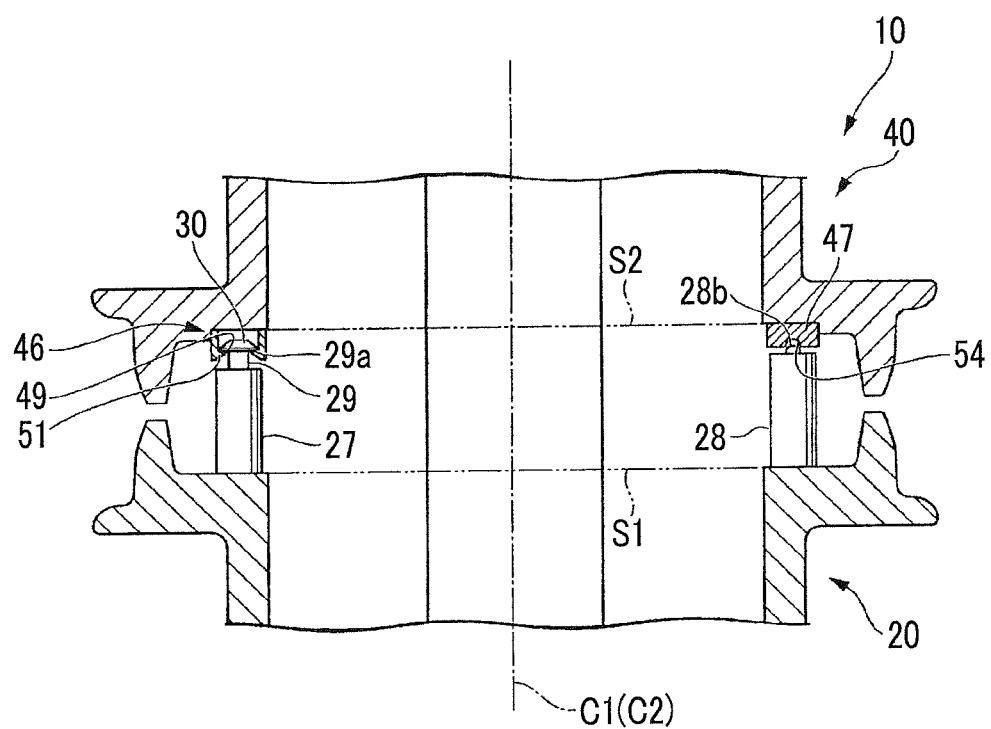
FIG. 14 is a cross-sectional view illustrating a state where the upper rim of which the protrusion is disposed in the groove portion of the pin of the lower rim, is raised.

When the upper rim 40 is raised from the state where the protrusion 28b is engaged with the concave portion 54, due to gravity applied to the lower rim 20, as illustrated in FIG. 14, the lower rim 20 is moved so as to be separated from the upper rim 40, that is, the first reference plane S1 is moved so as to be separated from the second reference plane S2. At this time, the side surface 29a of the groove portion 29 is engaged with the protrusion 51 such that the pin receiving portion 46 supports the pin 27 and thus the lower rim 20 is suspended from the upper rim 40. The stand 28 is separated from the stand receiving portion 47 such that the engagement between the protrusion 28b and the concave portion 54 is released.

As described above, when the rim assembly 10 is detached from the body unit 60, the protrusion 51 is disposed in the groove portion 29 and thus the rims 20 and 40 are engaged with each other. On the other hand, when the rim assembly 10 is mounted on the body unit 60, as described later, the engagement is released, and the rims 20 and 40 are fixed by an engaging mechanism 76.

As illustrated in FIG. 1, the body unit 60 includes a lower spindle (rotating body) 62 which is supported on a base (support portion) 61 so as to be rotatable, and an elevating mechanism 63 which is mounted on the base 61.

Figure 15:
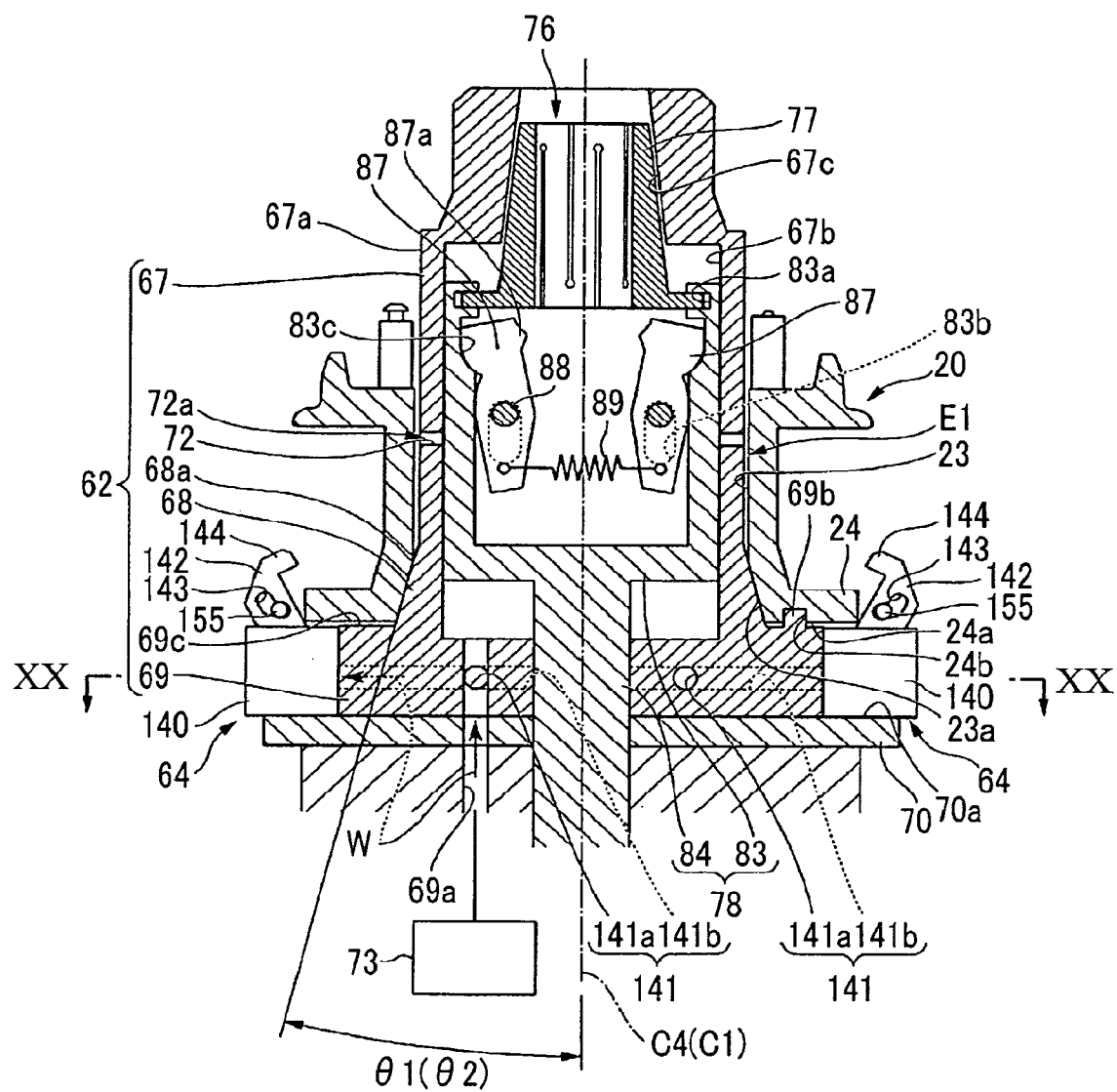
FIG. 15 is a cross-sectional view illustrating a state where an engaging mechanism of the tire holding apparatus is in a standby state.

As illustrated in FIG. 15, the lower spindle 62 includes a cylindrical portion 67 which is formed in a substantially cylindrical shape, a tapered portion 68 which is provided in the lower end portion of the cylindrical portion 67 and is provided with an apparatus side inclined surface (support surface) 68a, of which the diameter increases from the outer peripheral surface 67a of the cylindrical portion 67 as it becomes separated from the cylindrical portion 67, and an enlarged diameter portion 69 which is provided in the lower end portion of the tapered portion 68 and has a larger outside diameter than that of the tapered portion 68 such that an upper surface 69c opposes the second flange portion 24 of the lower rim 20.

The outside diameter of the cylindrical portion 67 is set to be inserted into the lower through-hole 23 of the lower rim 20 and the upper through-hole 43 of the upper rim 40.

As illustrated in FIG. 15, the pipe line of the cylindrical portion 67 has a lower side which is a large diameter portion 67b having a constant inside diameter, and an upper side which is a small diameter portion 67c having a smaller diameter than that of the large diameter portion 67b. The small diameter portion 67c is formed so that the inside diameter thereof decreases toward the upward side. A hole portion 72, which communicates with the large diameter portion 67b through an opening 72a provided in the outer peripheral surface 67a of the cylindrical portion 67, is formed in the cylindrical portion 67. Although not illustrated, a tire hole portion is formed so as to supply air W between the lower rim 20 and the upper rim 40 when the rim assembly 10 is mounted on the lower spindle 62, and communicates with the large diameter portion 67b.

When the rim assembly 10 is mounted on the lower spindle 62, the hole portion 72 can be used to supply lubricating oil from the outside of the lower spindle 62 to the large diameter portion 67b.

As described later, when the rim side inclined surface 23a abuts on the apparatus side inclined surface 68a, the opening 72a is provided at a position that opposes the inner peripheral surface of the lower rim 20.

The apparatus side inclined surface 68a is formed in a shape of the side surface of a truncated cone having an axis C4 of the lower spindle 62 as the center axis, and is exposed to the side opposite to the axis C4. In other words, the apparatus side inclined surface 68a is directed to the side opposite to the axis C4. In this example, an angle θ1 between the axis C4 and the apparatus side inclined surface 68a and an angle θ2 between the axis C1 of the lower rim 20 and the rim side inclined surface 23a are set to be equal.

A ventilation hole (inflation flow passage) 69a which communicates with the large diameter portion 67b is formed in the enlarged diameter portion 69. The ventilation hole 69a is connected to an air supply source (inflation gas supply portion) 73 in the enlarged diameter portion 69 such that compressed air (inflation gas) W can be supplied into the large diameter portion 67b through the ventilation hole 69a. The air W supplied into the large diameter portion 67b is discharged to the outside through the tire hole portion (not illustrated). On the upper surface of the enlarged diameter portion 69, a positioning convex portion 69b which is engaged with the above-described positioning hole portion 24b is formed.

A state where the lower rim 20 is mounted on the lower spindle 62 configured as such will be described. As illustrated in FIG. 15, the lower spindle 62 is inserted into the lower through-hole 23 of the lower rim 20 so that the lower rim 20 is lowered while the direction of the lower rim 20 around the axis C1 is adjusted. When the rim side inclined surface 23a of the lower rim 20 abuts on the apparatus side inclined surface 68a of the lower spindle 62 by engaging the positioning hole portion 24b with the positioning convex portion 69b, the rim side inclined surface 23a comes into contact with the apparatus side inclined surface 68a.

At this time, a small gap E1 is formed between the outer peripheral surface 67a of the cylindrical portion 67 and the inner peripheral surface of the lower through-hole such that the second flange portion 24 is separated from the enlarged diameter portion 69. That is, the lower rim 20 is mainly supported by the apparatus side inclined surface 68a and is thus prevented from being inclined by the cylindrical portion 67.

When the lower spindle 62 is further inserted into the upper through-hole 43 of the upper rim 40, a small gap is formed between the outer peripheral surface 67a of the cylindrical portion 67 and the inner peripheral surface of the upper through-hole 43.

In the lower spindle 62, for example, the well-known engaging mechanism 76 described in Japanese Patent No. 3040514 is embedded. Specifically, the engaging mechanism 76 has a tapered sleeve 77 and a hook operating rod 78 connected to the tapered sleeve 77 as main components.

Figure 16:
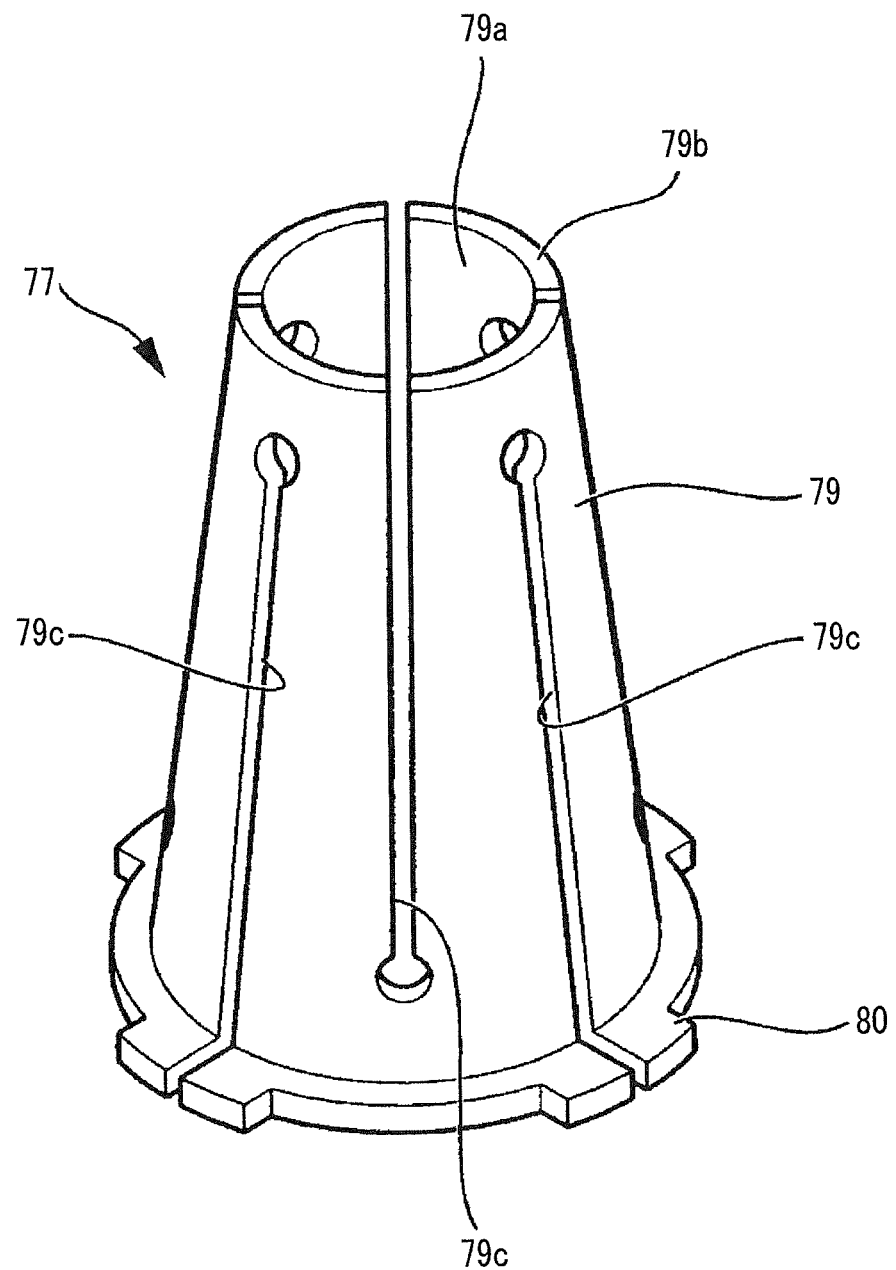
FIG. 16 is a perspective view of a tapered sleeve embedded in the lower spindle.

As illustrated in FIG. 16, the tapered sleeve 77 includes a body 79 which is formed in a substantially truncated cone shape, and a flange portion 80 which is provided on the outer peripheral surface of the lower end of the body 79. A through-hole 79a is formed in the body 79 in the axial direction thereof.

In a side wall 79b of the body 79, a plurality of slits 79c which penetrate the side wall 79b in the thickness direction and extend along the axis of the body 79 are formed. The tapered sleeve 77 configured as such receives a force compressed in the radial direction such that the width of the slit 79c decreases, thereby reducing the inside diameter of the through-hole 79a.

As illustrated in FIG. 15, the hook operating rod 78 includes a cylindrical portion 83 which is formed in a bottomed cylindrical shape, and a shaft-like member 84 which is fixed to the bottom surface of the cylindrical portion 83 and extends downward. In the upper end of the inner peripheral surface of the cylindrical portion 83, an annular groove 83a which is engaged with the flange portion 80 of the tapered sleeve 77 is formed. In the cylindrical portion 83, a pair of long holes 83b which penetrate the wall portion in the vertical direction as the long axis are formed.

A cylinder and the like (not illustrated) are connected to the lower end side of the shaft-like member 84 so that the hook operating rod 78 can vertically move.

In the cylindrical portion 83, a pair of hooks 87 are arranged so as to oppose each other with the axis C4 interposed therebetween. Both ends of a pin 88 as the fulcrum of the hook 87 are fixed to the lower spindle 62 through the long hole 83b of the cylindrical portion 83.

A spring 89 is connected to the lower end portions of the hooks 87, and is biased so that the lower end portions of the hooks 87 approach each other.

On the axis C4 side of the upper end portion of the hook 87, an engaging claw 87a is provided so as to protrude.

In the engaging mechanism 76 configured as such, in a standby state in which the hook operating rod 78 is moved downward with respect to the lower spindle 62 illustrated in FIG. 15, a small gap is formed between the outer peripheral surface of the tapered sleeve 77 in a natural state and the small diameter portion 67c of the cylindrical portion 67. Furthermore, the upper end portion of the hook 87 is fitted into a cutout 83c which is formed in the inner peripheral surface of the cylindrical portion 83 as the spring 89 is biased, and thus the distance between the engaging claws 87a is greater than the outside diameter of an upper rim shaft 112, which will be described later.

Figure 17:
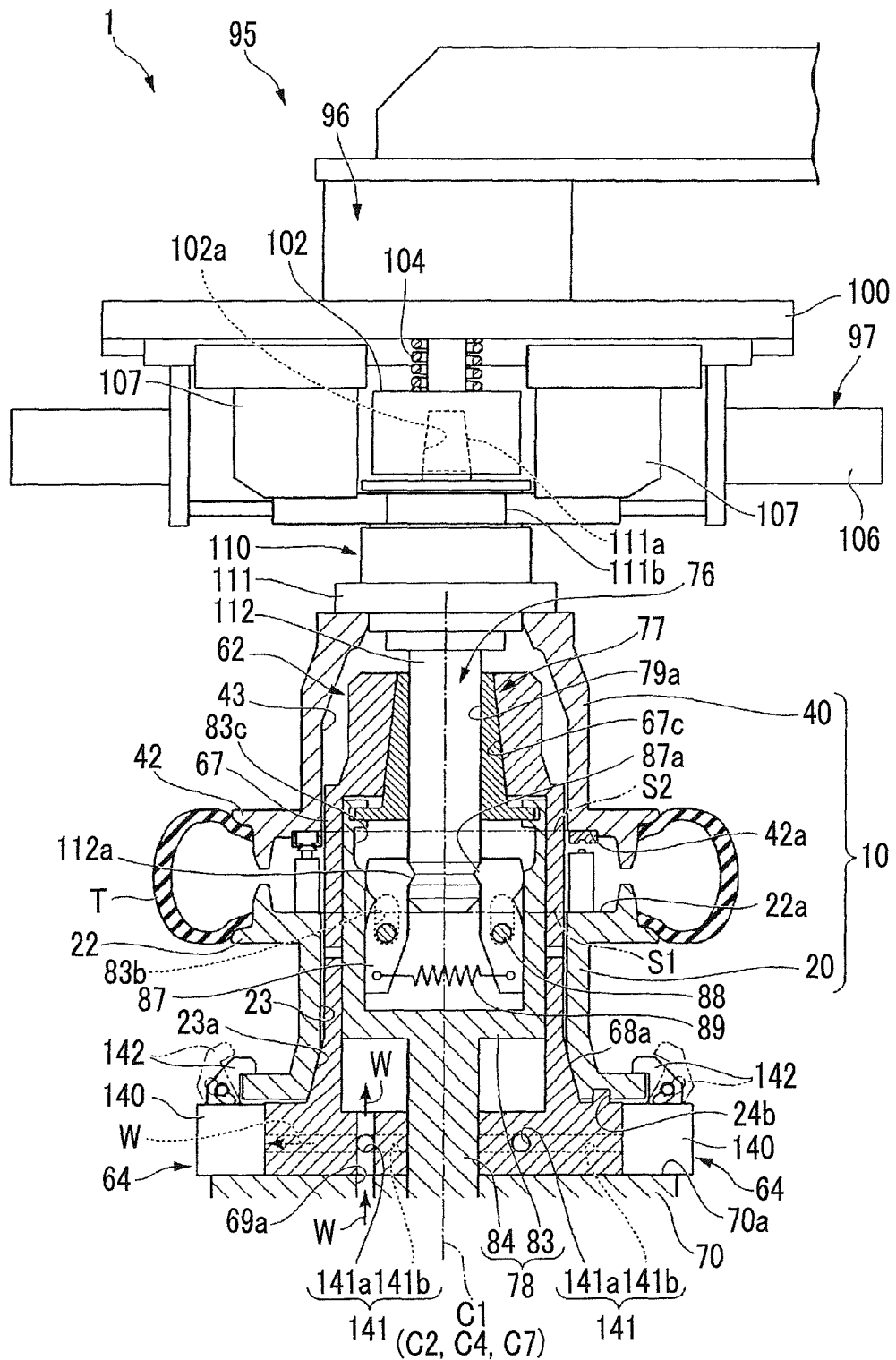
FIG. 17 is a cross-sectional view illustrating a state where the engaging mechanism is in an engaged state.

On the other hand, in an engaged state illustrated in FIG. 17 in which the hook operating rod 78 is moved upward, the tapered sleeve 77 is moved upward and is press-fitted into the small diameter portion 67c so as to be compressed in the radial direction, and thus the inside diameter of the through-hole 79a decreases.

As the hook operating rod 78 is moved upward with respect to the hook 87, the upper end portion of the hook 87 is pushed out from the cutout 83c, and thus the distance between the engaging claws 87a decreases. At this time, since the pin 88 moves in the long hole 83b, the hook operating rod 78 is not constrained from moving by the pin 88.

The lower spindle 62 is supported by a bearing (not illustrated) on the base 61. The lower spindle 62 can be rotated around the axis C4 by a servomotor 90 illustrated in FIG. 1.

In the elevating mechanism 63, as illustrated in FIG. 1, a rim elevator 95 is mounted on a frame 93 which is fixed to the base 61 by a ball screw 94. The rim elevator 95 can be moved vertically by the ball screw 94.

Figure 18:
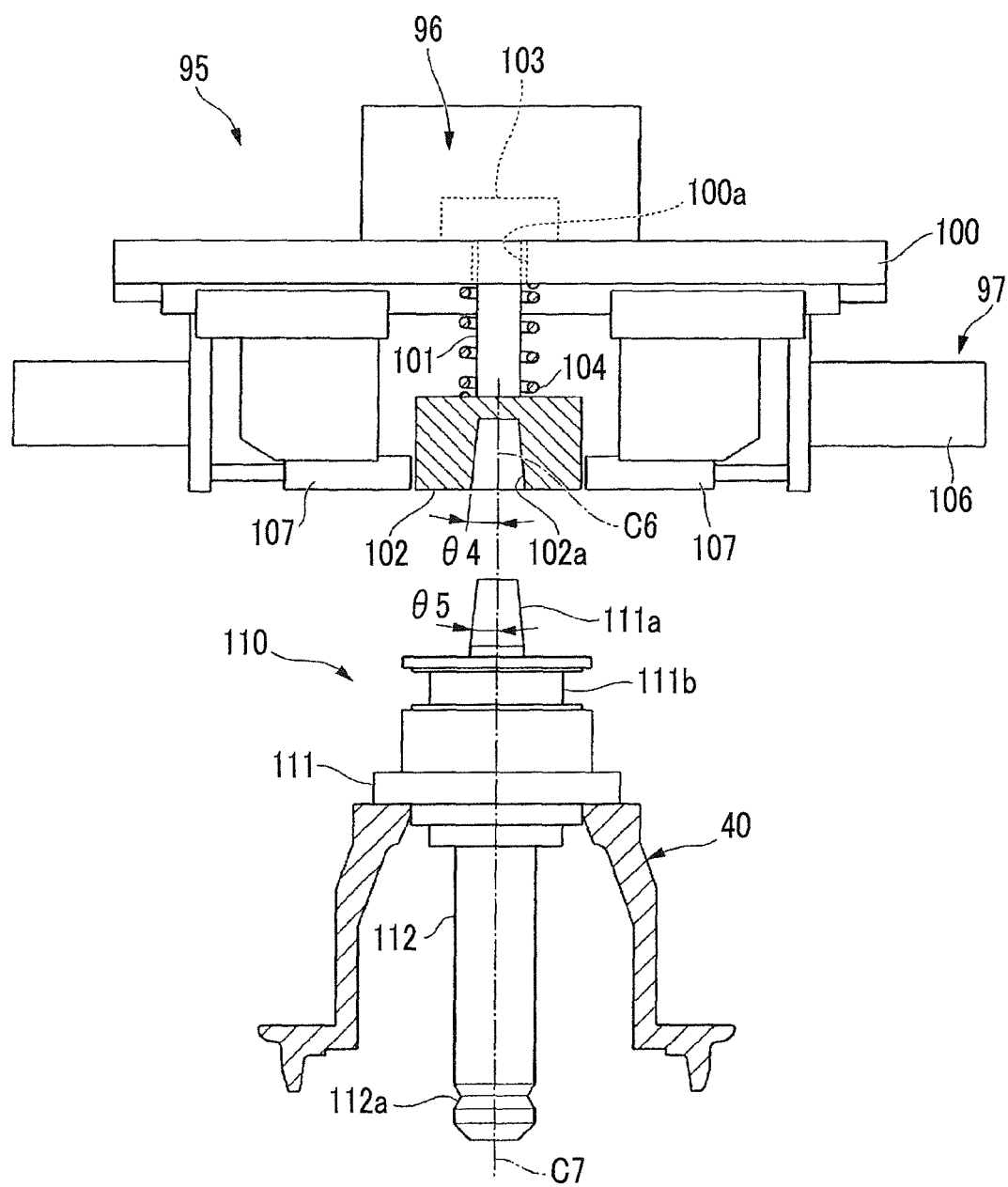
FIG. 18 is a cross-sectional view illustrating a state where a connection adaptor is detached from a rim elevator of the tire holding apparatus.

As illustrated in FIG. 18, the rim elevator 95 includes a positioning portion 96 and a chuck portion 97.

The positioning portion 96 is configured so that a positioning member 102 having a substantially disk shape and a support member 103 are respectively fixed to the lower end and the upper end of a rod 101 inserted into a through-hole 100a formed in a support plate 100. On the lower surface of the positioning member 102, a second apparatus side inclined surface 102a of which the diameter increases toward the lower side is formed. In this example, the second apparatus side inclined surface 102a is formed in a shape of the side surface of a truncated cone, and is exposed to an axis C6 side of the positioning member 102. In other words, the second apparatus side inclined surface 102a is directed to the side opposite to the axis C6.

A spring 104 inserted into the rod 101 is locked to the lower surface of the support plate 100 and the upper surface of the positioning member 102, thereby generating a force to separate the support plate 100 and the positioning member 102 from each other regardless of the distance between the support plate 100 and the positioning member 102. The outside diameter of the support member 103 is larger than the outside diameter of the through-hole 100a such that the support member 103 is locked to the upper surface of the support plate 100.

In the chuck portion 97, a pair of gripping members 107 are mounted on air cylinders 106 so as to be slidable in a direction parallel to the horizontal plane.

The positioning portion 96 and the chuck portion 97 described above can be detachably mounted on a connection adaptor 110 which is mounted on the upper rim 40.

The connection adaptor 110 includes an adaptor body 111 which is detachably mounted on the upper rim 40 by a bolt (not illustrated) or the like, and an upper rim shaft 112 which is fixed to the lower portion of the adaptor body 111. The adaptor body 111 and the upper rim shaft 112 may be formed so as to be integrated, or may be joined to each other after being separately formed.

A second rim side inclined surface 111a is formed in the upper portion of the adaptor body 111. The second rim side inclined surface 111a is formed in a shape of the side surface of a truncated cone, and is exposed to the side opposite to an axis C7 of the connection adaptor 110. In other words, the second rim side inclined surface 111a is directed to the side opposite to the axis C7. In this example, an angle θ4 between the above-mentioned axis C6 and the second apparatus side inclined surface 102a is set to be equal to an angle θ5 between the axis C7 and the second rim side inclined surface 111a. An engaging groove 111b with which the gripping member 107 is engaged is formed in the outer peripheral surface of the adaptor body 111.

An engaging concave portion 112a which is engaged with the above-mentioned engaging claw 87a is formed in the outer peripheral surface of the lower end portion of the upper rim shaft 112.

When the connection adaptor 110 is mounted on the rim elevator 95 configured as such, the following procedure is applied. The air cylinders 106 widen the gap between the pair of gripping members 107 in advance.

As illustrated in FIG. 17, the adaptor body 111 is inserted into the positioning member 102 so that the second rim side inclined surface 111a abuts on the second apparatus side inclined surface 102a. In a state where the connection adaptor 110 is moved toward the support plate 100 against the biasing force of the spring 104, the gripping members 107 are engaged with the engaging groove 111b of the adaptor body 111.

The connection adaptor 110 is engaged by the gripping members 107 of which the positions are adjusted to maintain a relative center, and is thus aligned with the direction of the axis C7 of the connection adaptor 110 and the direction parallel to the horizontal surface. Furthermore, since the second rim side inclined surface 111a is biased downward against the second apparatus side inclined surface 102a, the connection adaptor 110 is reliably positioned in the direction parallel to the horizontal surface which is perpendicular to the axis C7.

Next, the fixing mechanism 64 will be described in detail. As illustrated in FIGS. 1, 15, 17, 19A, 19B, 19C, and 20, a plurality of fixing mechanisms 64 are provided in the lower spindle 62 to clamp the lower rim 20 to the apparatus side inclined surface 68a.

Here, the enlarged diameter portion 69 in the lower spindle 62 includes an enlarged diameter portion flange portion 70 which is formed so as to have a large diameter which protrudes outward in the radial direction of the axis C4 below the second flange portion 24 of the lower rim 20.

Figure 20:
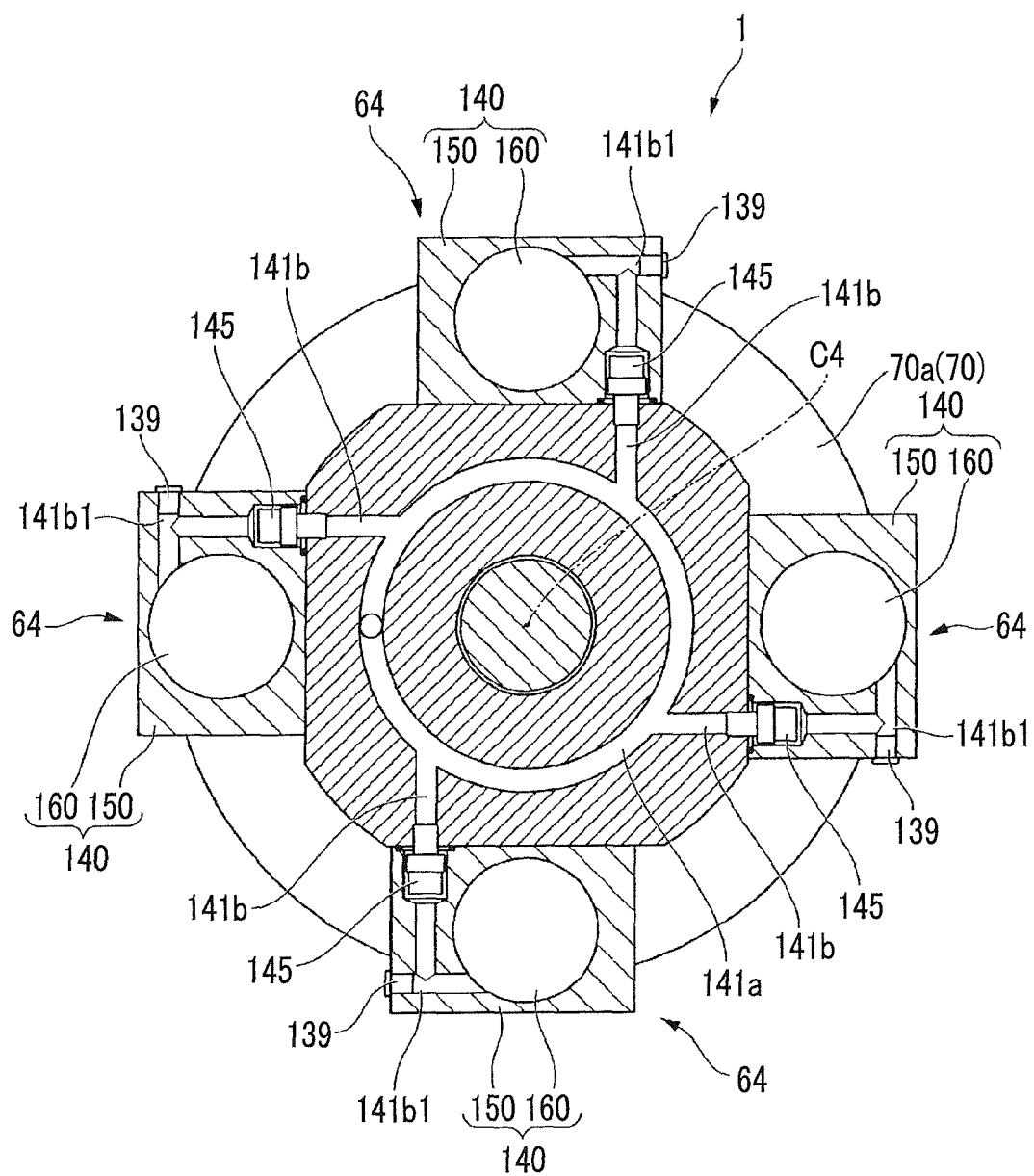
FIG. 20 is a cross-sectional view taken along line XX-XX of FIG. 15.

Furthermore, as illustrated in FIG. 20, the plurality of (in this embodiment, four in the circumferential direction at equal intervals) fixing mechanisms 64 are provided in an upper surface 70a of the enlarged diameter portion flange portion 70 in the circumferential direction of the axis C4 at intervals.

Each of the fixing mechanisms 64 includes a piston 140 which is provided in the upper surface 70a of the enlarged diameter portion flange portion 70, a drive pipe line 141 which connects the piston 140 to the ventilation hole 69a of the enlarged diameter portion 69, and a hook 142 which is mounted on the piston 140 and is provided so as to be rotatable around an axis perpendicular to the axis C4.

The fixing mechanisms 64 includes a check valve 145 which is provided in the drive pipe line 141 so as to prevent the backflow of the air W from the piston 140 to the ventilation hole 69a.

Figure 19A:
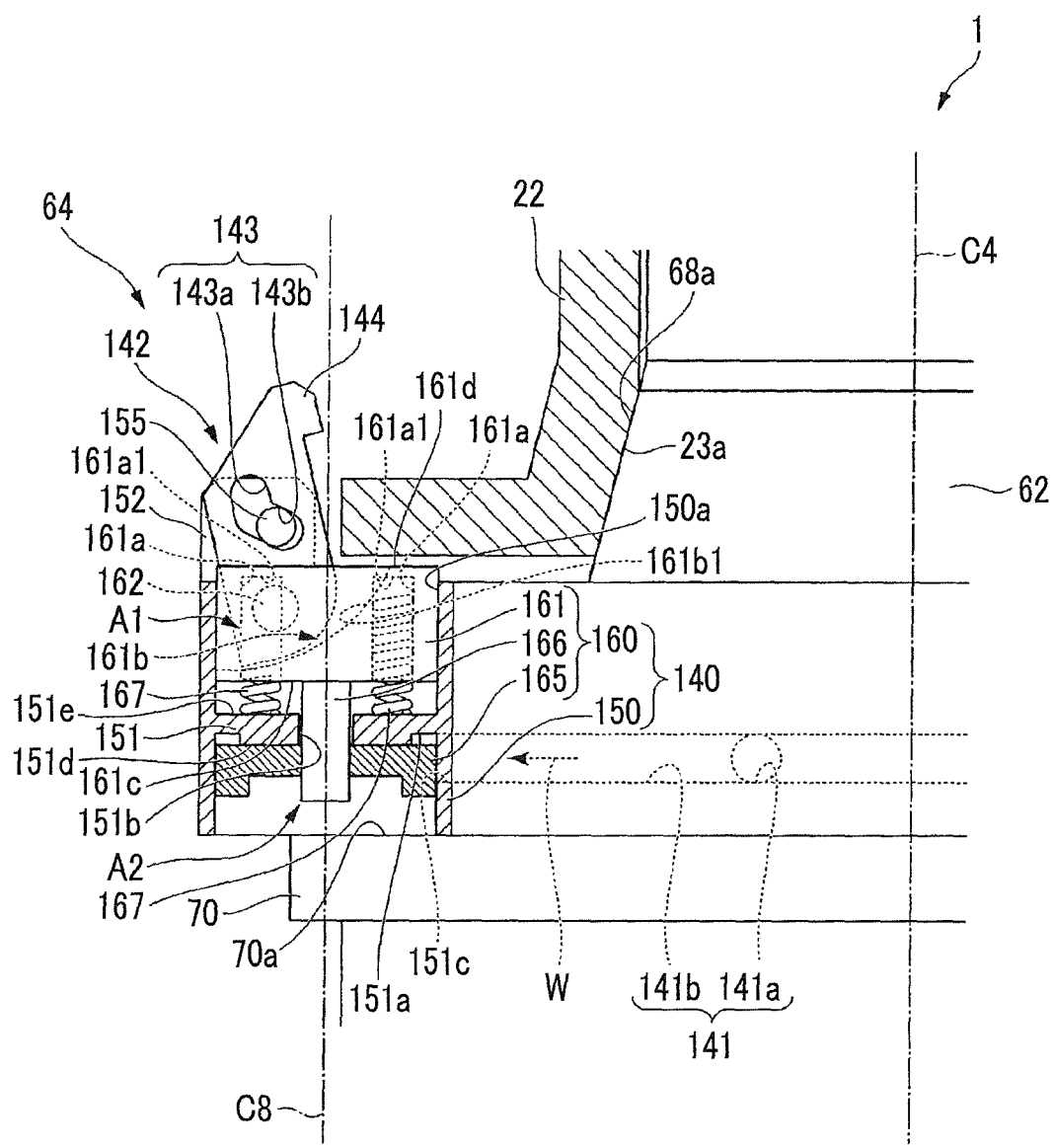
FIG. 19A is a front view of a fixing mechanism of the tire holding apparatus, where a released state is illustrated.
Figure 19B:
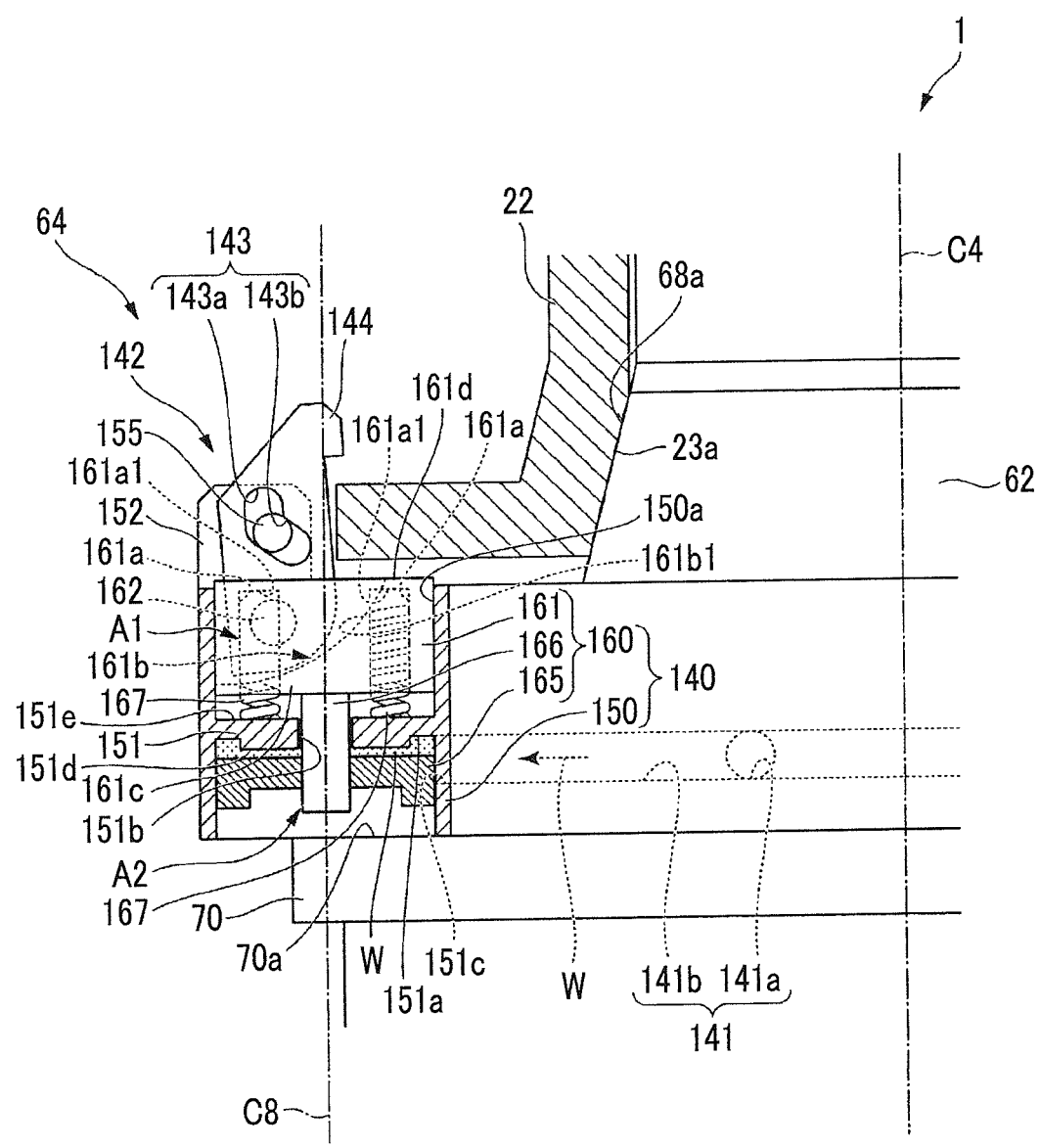
FIG. 19B is a front view of the fixing mechanism of the tire holding apparatus, where a transition from the released state to a fixed state is illustrated.
Figure 19C:
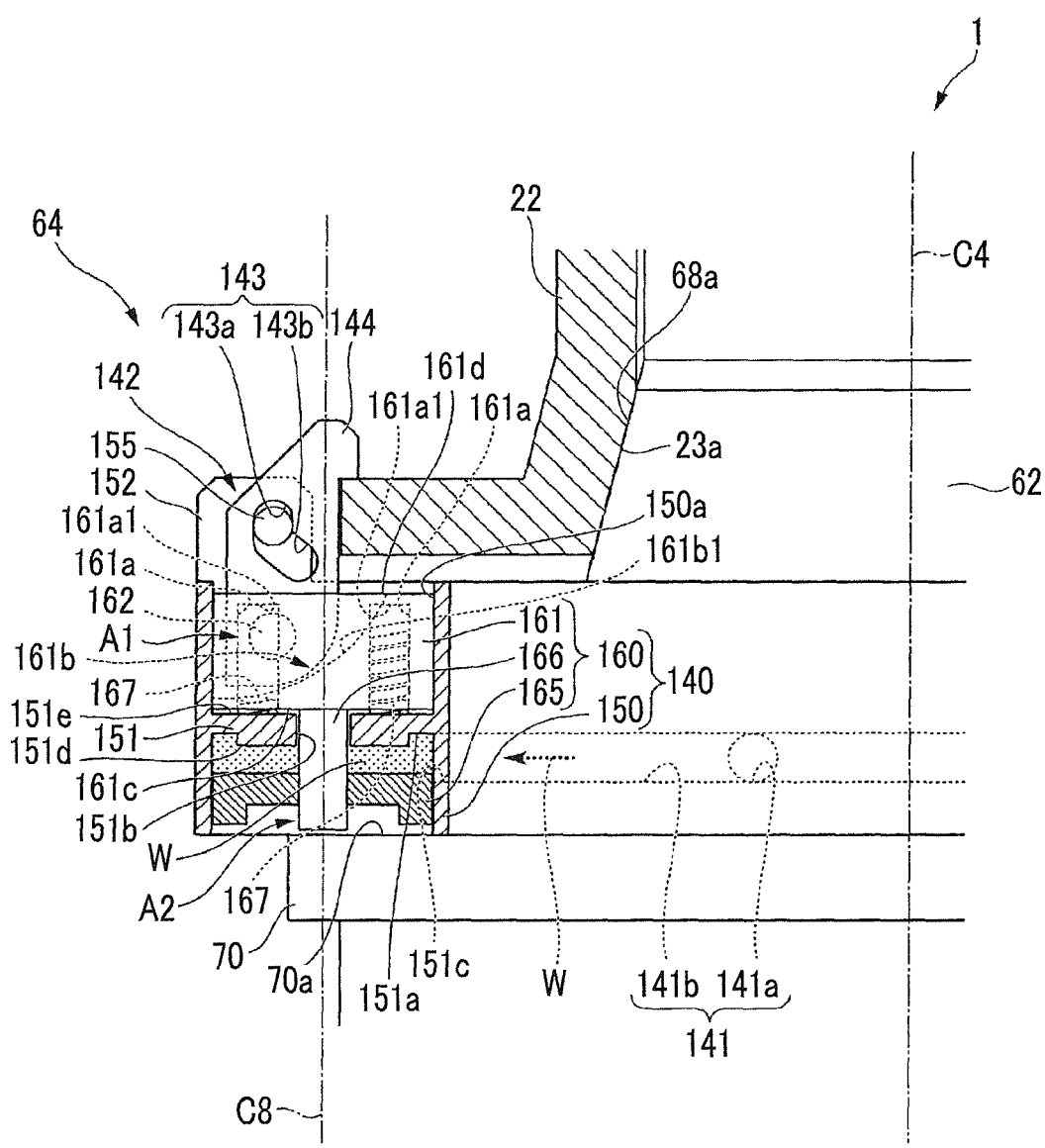
FIG. 19C is a front view of the fixing mechanism of the tire holding apparatus, where the fixed state is illustrated.

As illustrated in FIGS. 19A, 19B, and 19C, the piston 140 includes a cylinder 150 having a cylindrical shape, and a piston body 160 which is accommodated in the cylinder 150.

In the upper surface 70a of the enlarged diameter portion flange portion 70, the cylinder 150 is provided so that a center line C8 thereof is directed to the same direction as the axis C4. In addition, a partitioning plate 151 is provided so as to vertically partition the inside of the cylinder 150 such that the inside thereof is divided into an upper space A1 and a lower space A2.

The partitioning plate 151 is provided with a through-hole 151b which vertically penetrates the center portion of the axis of the cylinder 150. In addition, an annular concave portion 151a which is recessed upward in the circumferential direction of the cylinder 150 is formed in the lower surface 151d of the partitioning plate 151 at a position which comes into contact with an inner peripheral surface 150a of the cylinder 150.

Moreover, a communication hole 151c, which is open toward the annular concave portion 151a and communicates with the lower space A2 and the outside of the cylinder 150, is formed in the cylinder 150.

The cylinder 150 includes a guide pin support portion 152 which protrudes upward from the upper end portion thereof, and a guide pin 155 which extends in an axial direction perpendicular to the axis C4 (a direction toward the inside of the page of the figure in the piston 140 illustrated in FIGS. 19A, 19B, and 19C) is mounted on the guide pin support portion 152.

The piston body 160 is provided in the cylinder 150. The piston body 160 includes an upper body 161 which is disposed in the upper space A1, a lower body 165 which is disposed in the lower space A2, and a connection portion 166 which connects the upper body 161 to the lower body 165 and is inserted into the through-hole 151b of the cylinder 150.

The upper body 161 has a columnar shape in which the outside diameter is approximately the same as the inside diameter of the cylinder 150, and is vertically movable while sliding along the inner peripheral surface 150a of the cylinder 150. In addition, a plurality of spring insertion portions 161a which are recessed upward from a lower surface 161c to an intermediate position are formed in the upper body 161. The spring insertion portion 161a is formed so as to avoid the position where a hook groove portion 161b, which will be described later, is formed.

Here, a spring 167 is inserted into the spring insertion portion 161a. One end of the spring 167 is mounted on an upper end surface 161a1 of the spring insertion portion 161a, the other end thereof is mounted on an upper surface 151e of the partitioning plate 151, thereby applying a biasing force in a direction to push up the upper body 161. The spring constant of the spring 167 is a value which enables the spring 167 to be pushed up against the total weight of the piston body 160 and the resistance to the cylinder 150 during sliding, or to be compressed by an operational force generated in the piston 140 when the air W is supplied.

The upper body 161 includes a hook support pin 162 which is mounted on the inside thereof so as to extend in the same direction as the extending direction of the guide pin 155 of the cylinder 150.

More specifically, the hook groove portion 161b which is recessed from an upper surface 161d to an intermediate position therebelow (above the spring insertion portion 161a) at an outer position in the radial direction of the axis C4 is formed in the upper body 161. The hook support pin 162 is disposed in the hook groove portion 161b, that is, the hook support pin 162 is disposed in the upper body 161 at the outer position in the radial direction of the axis C4, which is separated from the axis C4.

The shape of a bottom surface 161b1 of the hook groove portion 161b is a curved surface which is smoothly inclined downward from the upper surface 161d in a direction from the inside to the outside in the radial direction of the axis C4 when viewed from the extending direction of the hook support pin 162 in this embodiment (a direction toward the inside of the page of FIG. 19A, 19B, or 19C). Accordingly, when the hook 142 is mounted on the hook support pin 162 in order to operate, the hook 142 does not interfere with the upper body 161. The shape of the hook groove portion 161b is not limited to that in this embodiment as long as the shape does not interfere with the hook 142. For example, the bottom surface 161b1 of the hook groove portion 161b may not be inclined, and the hook groove portion 161b may have a rectangular groove shape that is recessed downward from the upper surface 161d.

Similarly to upper body 161, the lower body 165 has a columnar shape in which the outside diameter is approximately the same as the inside diameter of the cylinder 150, and is vertically movable while sliding along the inner peripheral surface 150a of the cylinder 150.

The connection portion 166 has a columnar shape in which the outside diameter is approximately the same as the inside diameter of the through-hole 151b of the cylinder 150 so as not to enable gas to flow between the upper space A1 and the lower space A2, and connects the upper body 161 to the lower body 165 so as to enable the upper body 161 and the lower body 165 to move vertically while being integrated with each other.

The hook 142 is disposed in the hook groove portion 161b and the lower portion thereof is mounted on the hook support pin 162 of the piston 140 so as to be supported to rotate around the hook support pin 162. The shape of the lower portion of the hook 142 is a curved surface shape which curves along the bottom surface 161b1 so as not to interfere with the bottom surface 161b1 of the hook groove portion 161b when the hook 142 is mounted on the hook support pin in the hook groove portion 161b in order to operate.

In the upper portion of the hook 142, a guide hole 143 into which the guide pin 155 of the cylinder 150 is inserted is formed.

The guide hole 143 includes, a first long hole 143a of which the dimensions in a width direction perpendicular to the vertical direction and the extending direction of the guide pin 155 are approximately the same as the diameter of the guide pin 155 and which vertically extends in a state where the hook 142 is rotated and vertically stands straight, and a second long hole 143b of which the dimensions in the width direction are approximately the same as the diameter of the guide pin 155 to be connected to the first long hole 143a and which extends so as to be inclined toward the axis C4 in the downward direction.

The hook 142 includes an engaging portion 144 which protrudes from the upper end portion thereof toward the axis C4, and in a fixed state which will be described later, the engaging portion 144 is engaged with the second flange portion 24 of the lower rim 20.

As illustrated in FIG. 20, the drive pipe line 141 in each of the fixing mechanisms 64 includes an annular flow passage 141a which is formed in the enlarged diameter portion 69 with respect to the axis C4 as the center, and branch flow passages 141b which branch off from the annular flow passage 141a and are connected to the pistons 140. Since the cylinder 150 and the ventilation hole 69a are connected to each other in this manner, the compressed air W can be introduced from the ventilation hole 69a into the communication hole 151c of the cylinder 150.

Each of the branch flow passages 141b includes an exhaust flow passage 141b1 which is open and extends toward the outside of the piston 140, and a closing member (opening portion) 139 is provided in the opening part to close the exhaust flow passage 141b1.

The check valve 145 is provided in the intermediate position of each of the drive pipe lines 141 so as to prevent backflow when the air W is introduced from the ventilation hole 69a into the cylinder 150.

Next, an operating state of the fixing mechanism will be described with reference to FIGS. 19A, 19B, and 19C.

As illustrated in FIG. 19A, first, the compressed air W from the ventilation hole 69a is introduced into the lower space A2 of the cylinder 150 through the annular concave portion 151a. In this state, the lower body 165 of the piston body 160 comes into contact with the lower surface 151d of the partitioning plate 151 of the cylinder 150. The guide pin 155 is positioned in the second long hole 143b in the guide hole 143.

As illustrated in FIG. 19B, the lower body 165 is pushed down as the amount of the introduced air W is increased. Accordingly, the upper body 161 is also pushed down. While the hook 142 rotates around the hook support pin 162, the guide pin 155 is guided to the connection point between the second long hole 143b and the first long hole 143a in the guide hole 143. At this time, the engaging portion 144 of the hook 142 gradually approaches the second flange portion 24 of the lower rim 20.

Thereafter, as illustrated in FIG. 19C, the amount of the introduced air W is further increased such that the upper body 161 is pushed down and the guide pin 155 is guided upward in the first long hole 143a. Therefore, the hook 142 vertically stands straight, and thus the engaging portion 144 is engaged with the second flange portion 24. Accordingly, the fixing mechanism 64 enters the fixed state.

Contrary to this, when the exhaust flow passage 141b1 is opened by detaching the closing member 139 and thus the air W is discharged from the lower space A2, the lower body 165 and the upper body 161 are pushed up by the force of the spring 167 and thus the engagement between the hook 142 and the second flange portion 24 is released. Therefore, the fixing mechanism 64 enters the released state. In this manner, the fixing mechanism 64 can be switched between the fixed state and the released state.

As illustrated in FIG. 1, in the base 61, a load wheel 124 is disposed on a rail 123. The load wheel 124 can approach the lower spindle 62 or be separated from the lower spindle 62 by travelling on the rail 123.

In the rim exchanging unit 130, a turning base 131 can approach the lower spindle 62 or can be separated from the lower spindle 62 by traveling on a rail 132. A turning shaft 133 is provided, in the upper portion of the turning base 131. A plurality of stocker frames 134 are connected to the turning shaft 133 so that the turning shaft 133 rotates the stocker frames 134 around the axis of the turning shaft 133. Accordingly, the turning shaft 133 can allow the rim assembly 10 disposed on a rim pedestal 135 of the stocker frame 134 to approach the lower spindle 62 or to be separated from the lower spindle 62.

The positioning convex portion 69b (see FIG. 23) is formed on each of the stocker frames 134 so that the phase of the rim assembly 10 disposed on the stocker frame 134 around the axis C1 is determined.

Next, the operation of the tire holding apparatus 1 configured as such will be described in a case of exchanging the rim assembly 10 mounted on the body unit 60 and in a case of mounting the tire T on the rim assembly 10 mounted on the body unit 60 for measurement.

First, the case of exchanging the rim assembly 10 will be described from, as illustrated in FIG. 1, the state where the rims 20 and 40 are separated from each other, the lower rim 20 is mounted on the lower spindle 62, and the connection adaptor 110 fixed to the upper rim 40 is mounted on the rim elevator 95 and moves upward. At this time, the engaging mechanism 76 in the lower spindle 62 is in the standby state, the fixing mechanism 64 is in the released state, and the load wheel 124 and the turning base 131 are in a state of being separated from the lower spindle 62.

Figure 21:
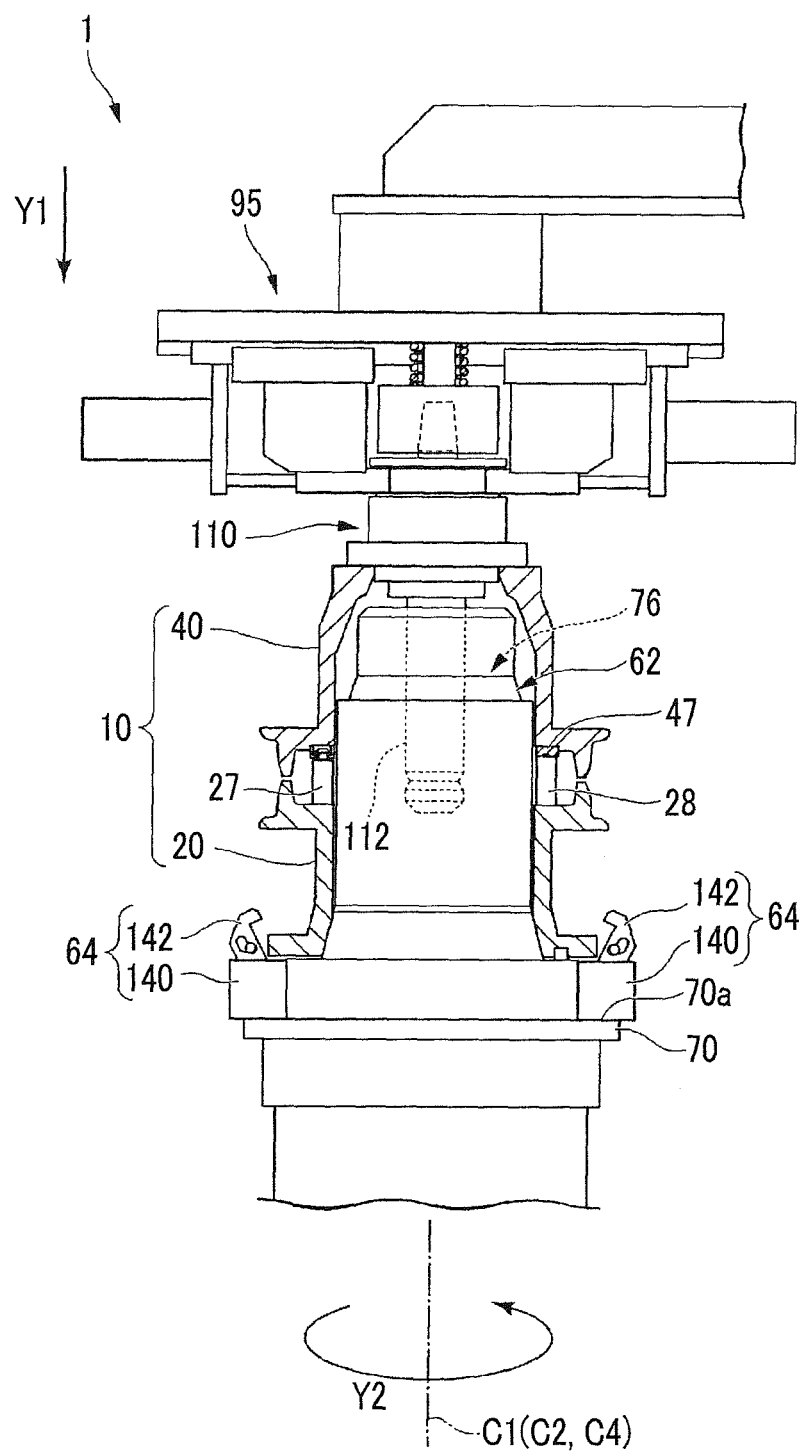
FIG. 21 is a view illustrating an operation of exchanging the rim assembly in the tire holding apparatus.

From this state, as indicated by the arrow Y1 of FIG. 21, the upper rim 40 is move downward by lowering the rim elevator 95 so that the upper rim 40 overlaps the lower rim 20. The phase relationship between the rims 20 and 40 at this time is illustrated in FIGS. 8 and 9, and the protrusion 28b is engaged with the guide concave portion 55 in the state where the stand receiving portion 47 abuts on the stand 28. In addition, the protrusion 30 of the pin 27 is inserted into the insertion opening 48. Although the upper rim shaft 112 is inserted into the engaging mechanism 76, since the engaging mechanism 76 is in the standby state, the engaging claw 87a of the hook 87 is not engaged with the engaging concave portion 112a of the upper rim shaft 112.

Subsequently, as indicated by the arrow Y2 of FIG. 21, the lower rim 20 is rotated counterclockwise along with the lower spindle 62 by the servomotor 90 around the axis C1. The phase relationship between the rims 20 and 40 at this time is illustrated in FIGS. 10 and 11. That is, due to the rotation of the lower rim 20, while the stand 28 abuts on the stand receiving portion 47, the protrusion 51 of the upper rim 40 is disposed in the groove portion 29 of the pin 27 and thus the pin receiving portion 46 and the pin 27 are engaged with each other such that the lower rim 20 and the upper rim 40 are integrated with each other. The protrusion 28b is engaged with the concave portion 54.

Subsequently, as indicated by the arrow Y3 of FIG. 22, the rim elevator 95 is raised so that the rim assembly 10 in which the rims 20 and 40 are integrated with each other is moved upward. At this time, as illustrated in FIG. 14, the pin receiving portion 46 of the upper rim 40 supports the pin 27 such that the lower rim 20 is suspended from the upper rim 40.

Figure 22:
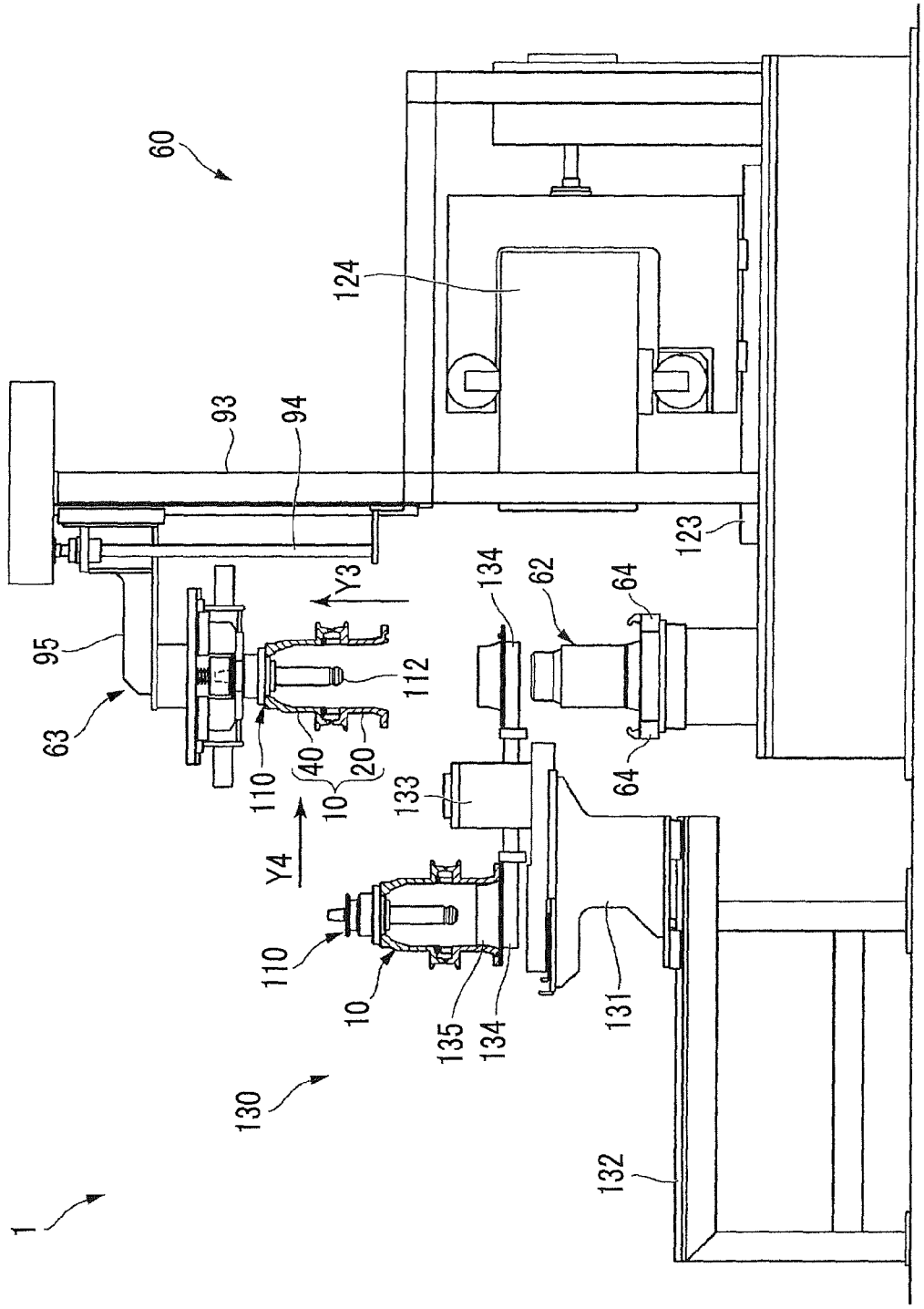
FIG. 22 is a view illustrating the operation of exchanging the rim assembly in the tire holding apparatus.

As indicated by the arrow Y4 of FIG. 22, the rim exchanging unit 130 is allowed to approach the lower spindle 62. At this time, the stocker frame 134 in which the rim assembly 10 is not disposed is disposed below the rim assembly 10 which is supported by the rim elevator 95.

Subsequently, as indicated by the arrow Y5 of FIG. 23, the rim elevator 95 is lowered so that the rim assembly 10 on which the connection adaptor 110 is mounted is disposed in the rim pedestal 135 on the stocker frame 134. At this time, the positioning hole portion 24b of the lower rim 20 is engaged with the positioning convex portion 69b which protrudes from the stocker frame 134.

As a result, the stand receiving portion 47 abuts on the stand 28 such that the lower rim 20 supports the upper rim 40. At this time, the pin 27 and the pin receiving portion 46 do not interfere with each other, and the pin 27 does not support the load of the upper rim 40, thereby preventing damage to the pin 27.

Figure 23:
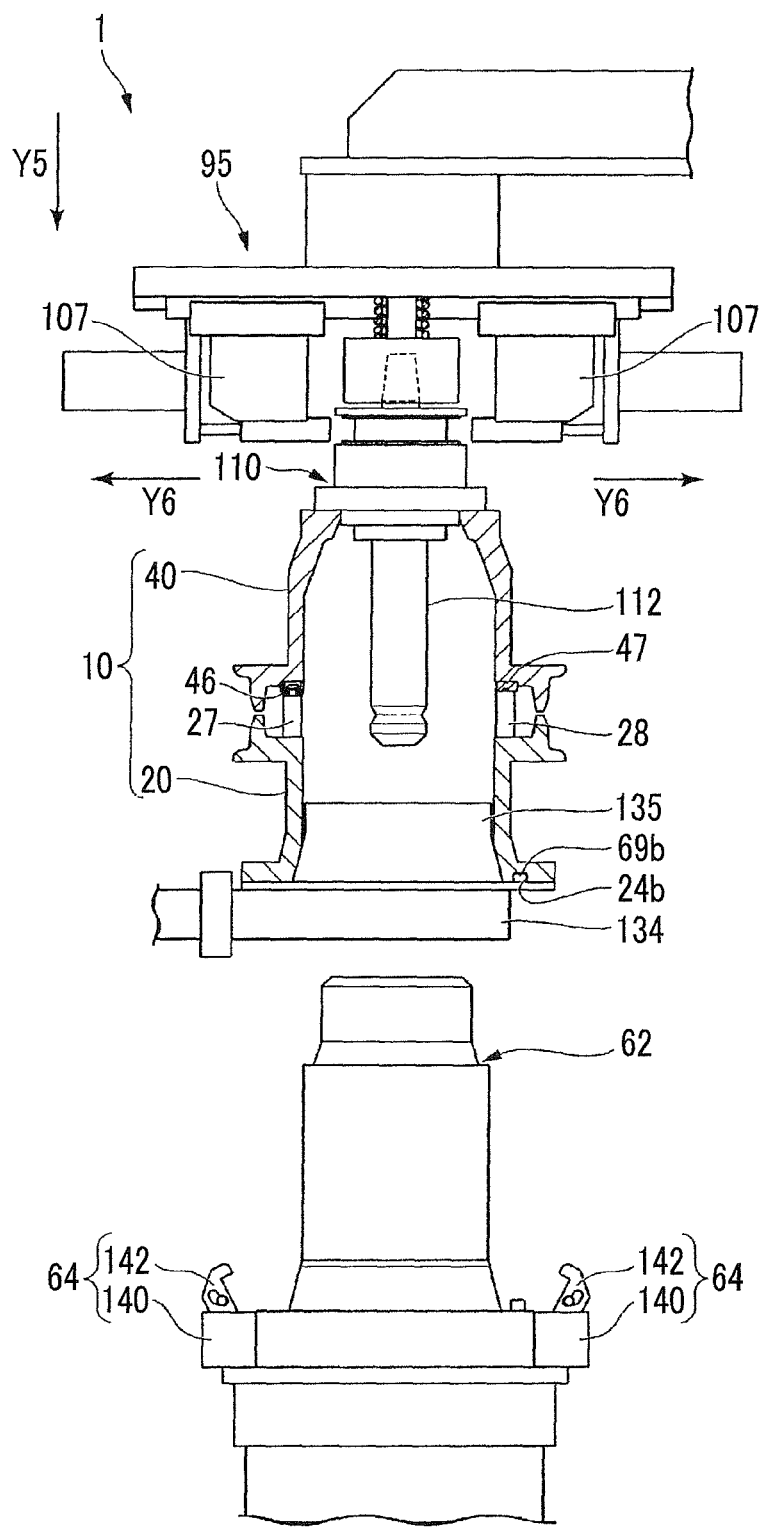
FIG. 23 is a view illustrating the operation of exchanging the rim assembly in the tire holding apparatus.

When the rim assembly 10 is disposed on the stocker frame 134, as indicated by the arrow Y6 of FIG. 23, the pair of gripping members 107 which support the connection adaptor 110 are moved so as to be separated from each other so that the rim assembly 10 is detached from the rim elevator 95. As indicated by the arrow Y7 of FIG. 24, the rim elevator 95 is raised so as to be separated from the rim exchanging unit 130.

Figure 24:
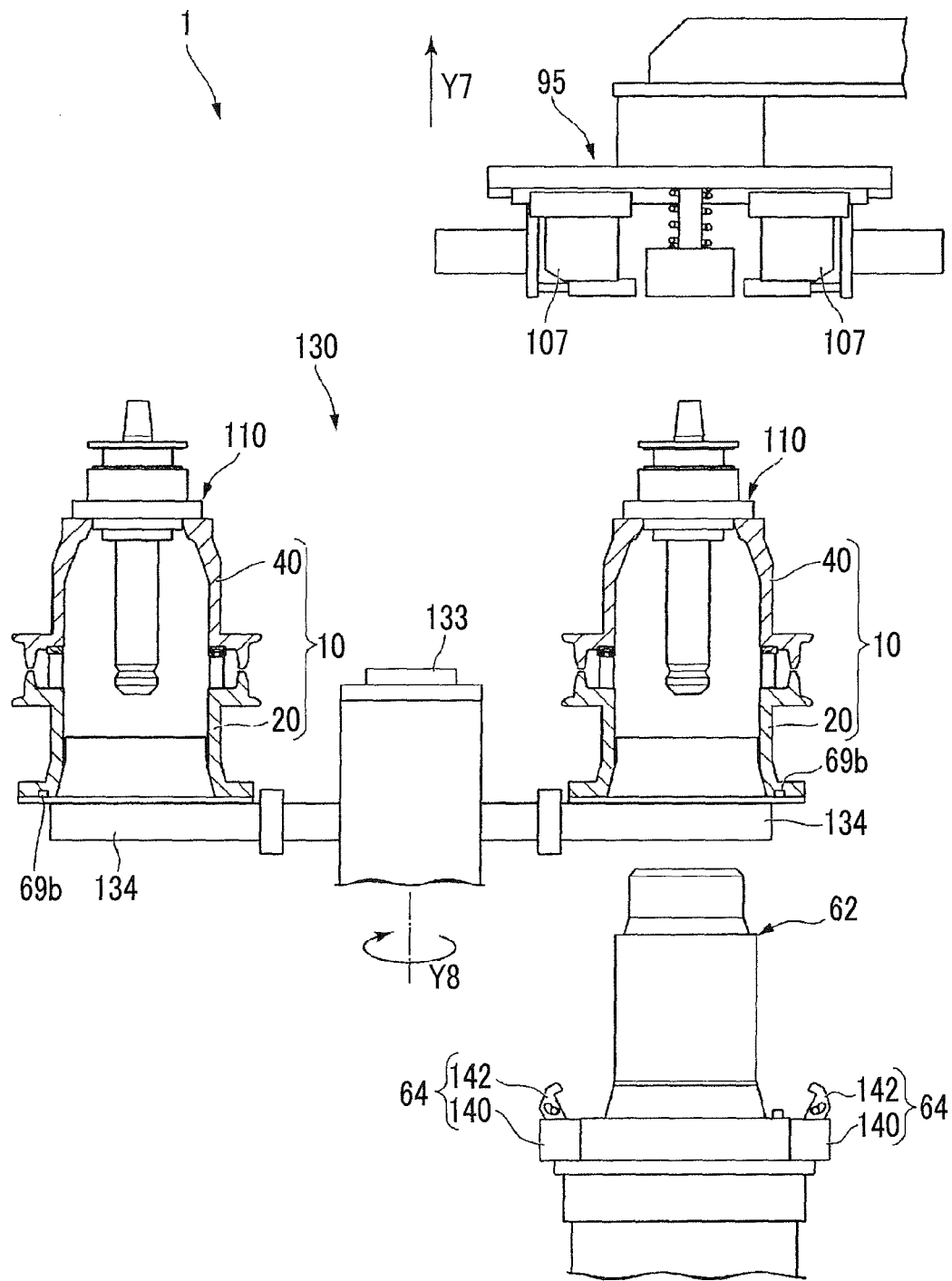
FIG. 24 is a view illustrating the operation of exchanging the rim assembly in the tire holding apparatus.

Thereafter, as indicated by the arrow Y8 of FIG. 24, the stocker frame 134 is rotated around the axis of the turning shaft 133 such that a different type of rim assembly 10 from that of the rim assembly 10 mounted on the body unit 60 until then is positioned below the rim elevator 95.

Figure 25:
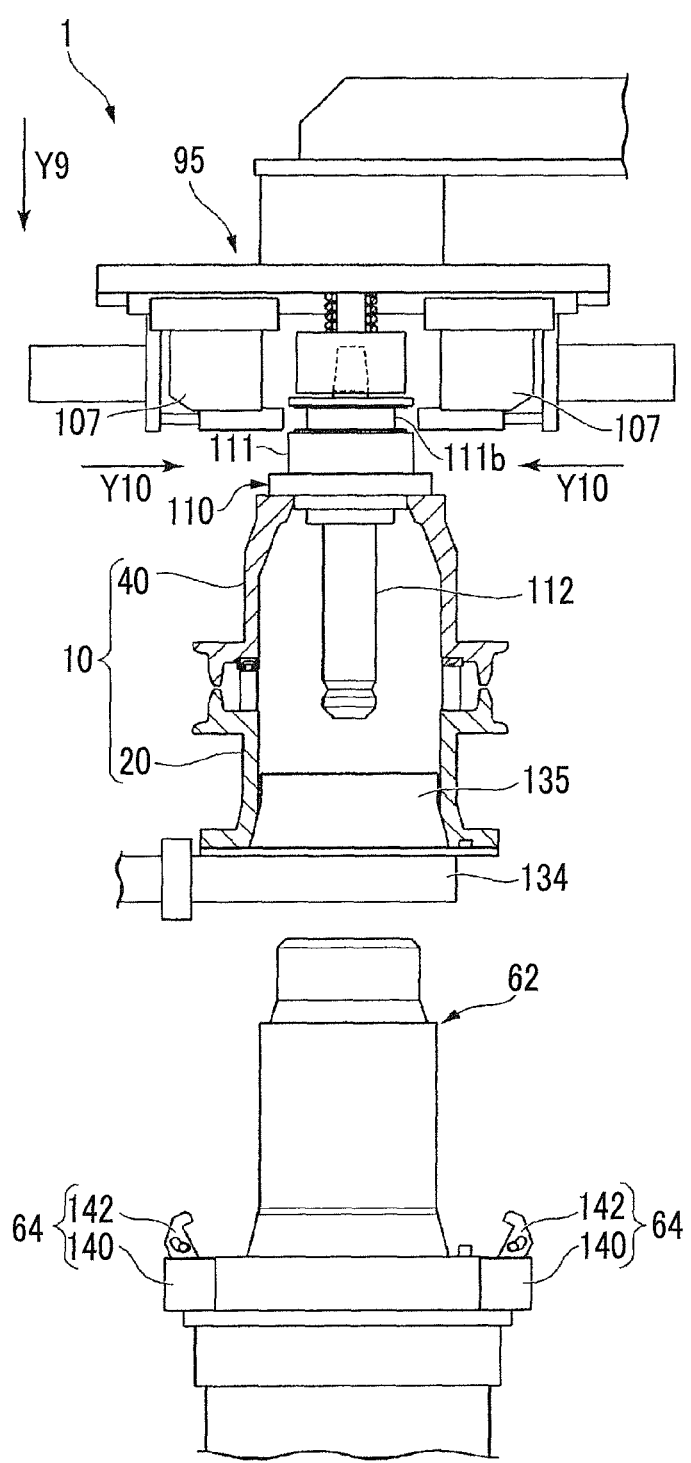
FIG. 25 is a view illustrating the operation of exchanging the rim assembly in the tire holding apparatus.

Subsequently, as indicated by the arrow Y9 of FIG. 25, the rim elevator 95 is lowered so that the gripping members 107 are moved so as to interpose the engaging groove 111b of the adaptor body 111 therebetween. As indicated by the arrow Y10, the gripping members 107 approach each other so that the gripping members 107 are engaged with the engaging groove 111b.

At this time, the lower rim 20 and the upper rim 40 of the rim assembly 10 are engaged with each other.

Figure 26:
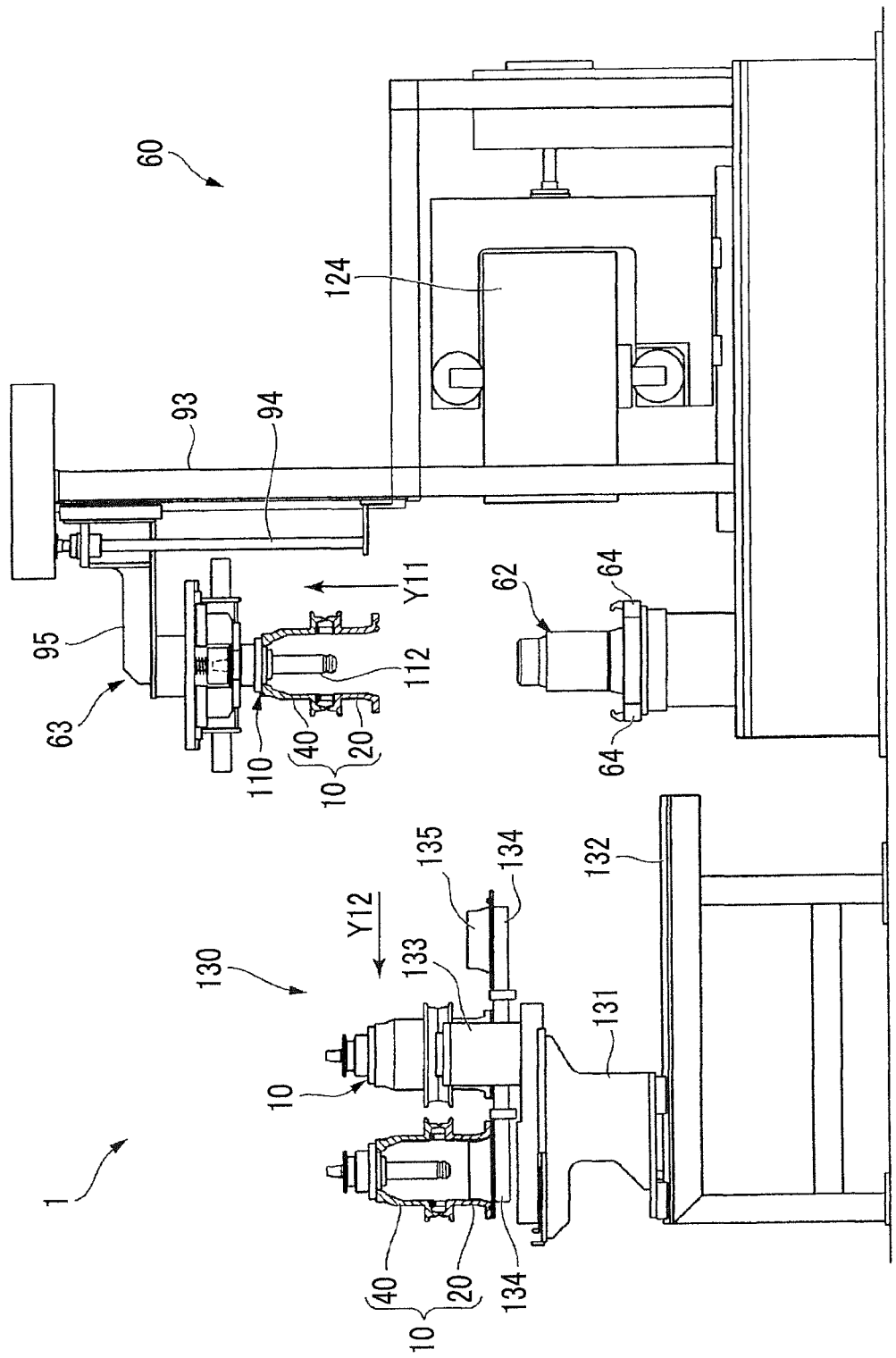
FIG. 26 is a view illustrating the operation of exchanging the rim assembly in a tire uniformity measuring apparatus.

As indicated by the arrow Y11 of FIG. 26, the rim elevator 95 engaged with the rim assembly 10 is raised. As indicated by the arrow Y12, the rim exchanging unit 130 is separated from the lower spindle 62 so that the stocker frame 134 of the rim exchanging unit 130 is evacuated from above the lower spindle 62.

Figure 27:
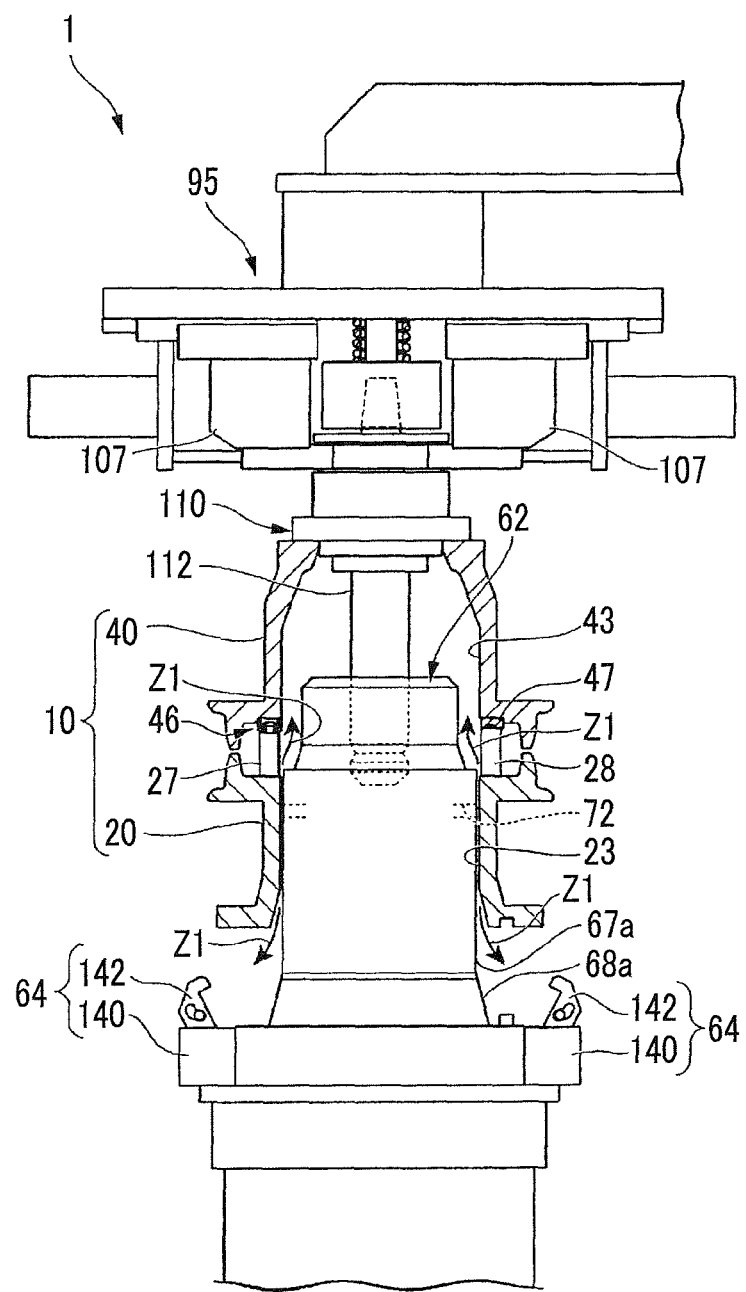
FIG. 27 is a view illustrating the operation of exchanging the rim assembly in the tire holding apparatus.

Subsequently, as illustrated in FIG. 27, the rim elevator 95 is lowered so that the rim assembly 10 is mounted on the lower spindle 62. At this time, the lower spindle 62 is inserted into the lower through-hole 23 of the lower rim 20 and the upper through-hole 43 of the upper rim 40. However, since the gap between the lower through-hole 23 and the lower spindle 62 is small as described above, there may be a case where the lower spindle 62 is not smoothly inserted into the lower through-hole 23. Even in this case, since the upper rim 40 is pressed down by the rim elevator 95, the stand 28 of the lower rim 20 is pushed down by the stand receiving portion 47 of the upper rim 40 such that the lower spindle 62 is inserted into the lower through-hole 23.

In addition, there may be a case where dust and the like adhere to the outer peripheral surface 67a or the apparatus side inclined surface 68a of the lower spindle 62 after detaching the rim assembly 10 or the like. In this case, the air W is supplied by an air supply source 73 so as to be discharged from the hole portion 72 in the state where the inner peripheral surface of the lower through-hole 23 opposes the opening 72a, and thus the air W flows upward or downward as indicated by the arrow Z1 and blows off the dust.

Figure 28:
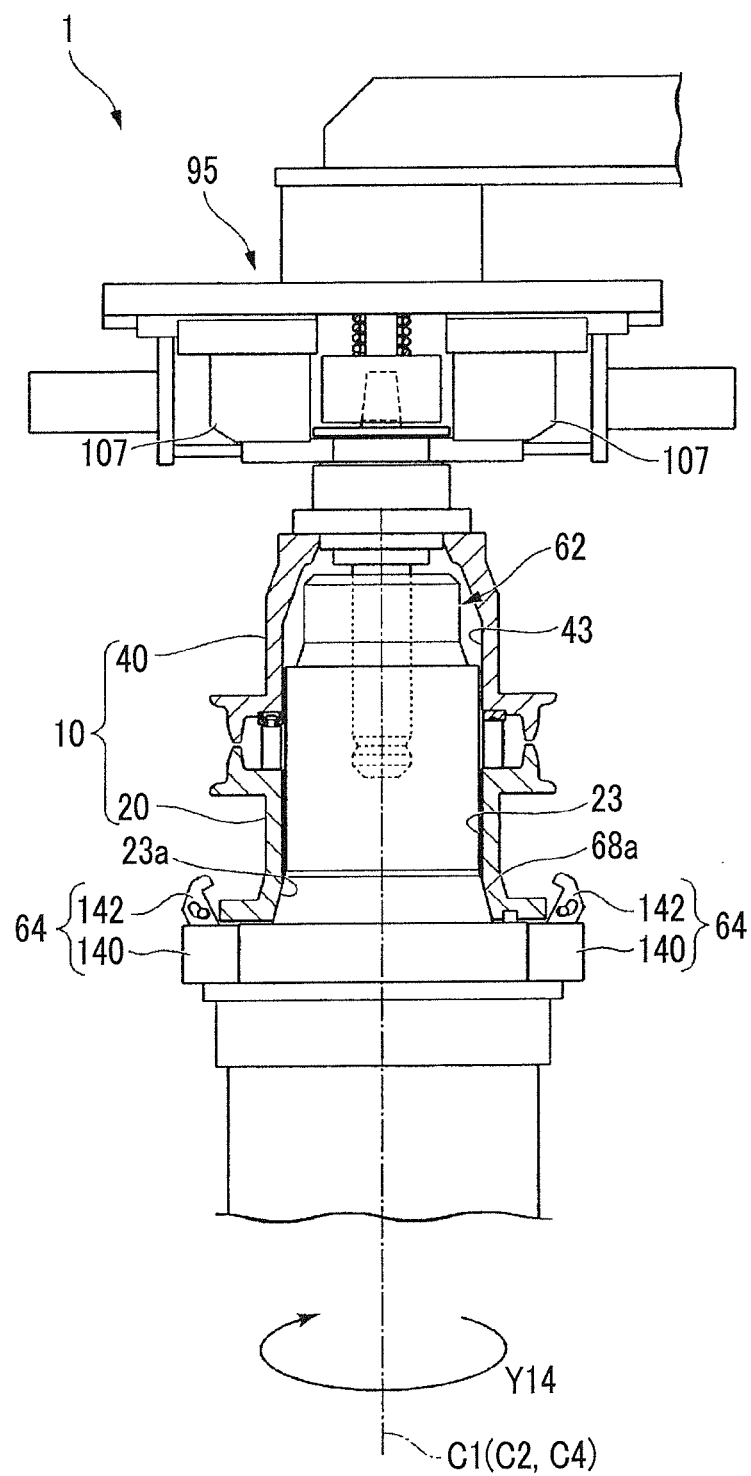
FIG. 28 is a view illustrating the operation of exchanging the rim assembly in the tire holding apparatus.

Furthermore, as illustrated in FIG. 28, the rim elevator 95 is lowered so that the rim side inclined surface 23a of the lower rim 20 abuts on the apparatus side inclined surface 68a of the lower spindle 62 and thus the apparatus side inclined surface 68a supports the rim assembly 10. At this time, since the lower spindle 62 is inserted into the through-holes 23 and 43, the rims 20 and 40 are prevented from being inclined with respect to the axis C4 of the lower spindle 62.

As indicated by the arrow Y14, the lower spindle 62 is rotated clockwise around the axis C4 in the plane view so that the lower rim 20 is rotated relative to the upper rim 40. At this time, the phase relationship between the upper rim 40 and the lower rim 20 is as illustrated in FIGS. 8 and 9. That is, due to the clockwise rotation of the lower rim 20, the protrusion 30 of the pin 27 reaches the insertion opening 48. Accordingly, the engagement between the pin receiving portion 46 and the pin 27 can be released. That is, the pin 27 is separated from the pin receiving portion 46 by raising the rim elevator 95, thereby dividing the rim assembly 10 into the lower rim 20 and the upper rim 40 as illustrated in FIG. 1.

Next, the case of mounting the tire T on the rim assembly 10 for measurement will be described.

From the state of the tire holding apparatus 1 illustrated in FIG. 1, the tire T is disposed on the flange portion 22 of the lower rim 20 as illustrated in FIG. 17. The rim elevator 95 is lowered to a predetermined rim width for tire measurement. At this time, the upper rim shaft 112 is inserted into the through-hole 79a of the tapered sleeve 77 of the engaging mechanism 76 and between the pair of hooks 87.

When the hook operating rod 78 is moved upward, the inside diameter of the through-hole 79a of the tapered sleeve 77 decreases such that the upper portion of the upper rim shaft 112 is fixed to the lower spindle 62 via the tapered sleeve 77 and the engaging claw 87a of the hook 87 is engaged with the engaging concave portion 112a of the upper rim shaft 112. As described above, by switching the engaging mechanism 76 from the standby state to the engaged state, the upper rim shaft 112 is fixed to the lower spindle 62. Accordingly, the lower spindle 62, the rim assembly 10, and the connection adaptor 110 are integrated with each other.

Subsequently, the air W is supplied by the air supply source 73 so as to be discharged from the tire hole portion (not illustrated) so that the air W in the tire T reaches a predetermined pressure and the tire T is fitted into the rims 20 and 40. At this time, the tire T is pressed and adhered to the flange portion 22 of the lower rim 20 or the flange portion 42 of the upper rim 40 by the pressure of the air W, and the lower rim 20 is also pressed against the apparatus side inclined surface 68a.

In addition, when the air W is supplied by the air supply source 73, the air W also flows into the fixing mechanism 64 such that the hook 122 operates. Therefore, the fixing mechanism 64 enters the fixed state (the solid line of FIG. 17) as described above such that the lower rim 20 is clamped to the apparatus side inclined surface 68a.

Thereafter, when the lower spindle 62 is rotated by the servomotor 90, the tire T rotates around the axis C4 along with the rim assembly 10 and the connection adaptor 110. The load wheel 124 is allowed to approach the lower spindle 62 and come into contact with the tire T, and measures the distribution of the load applied to the tire T.

After the measurement, the rotation of the lower spindle 62 is stopped. The tire T is exchanged with a new tire T for the next test. Specifically, first, the supply of the air W to the tire T by the air supply source 73 is stopped to reduce the pressure of the air W in the tire T. Thereafter, the tire T is detached from the rim assembly 10, and the new tire T for the next test is mounted. At this time, since the fixing mechanism 64 has the check valve 145, even when the pressure of the air W of the ventilation hole 69a is reduced, the air W in the cylinder 150 is restricted from flowing backward and flowing into the ventilation hole 69a. Therefore, the clamping of the lower rim 20 by the hook 142 is not released.

Figure 29:
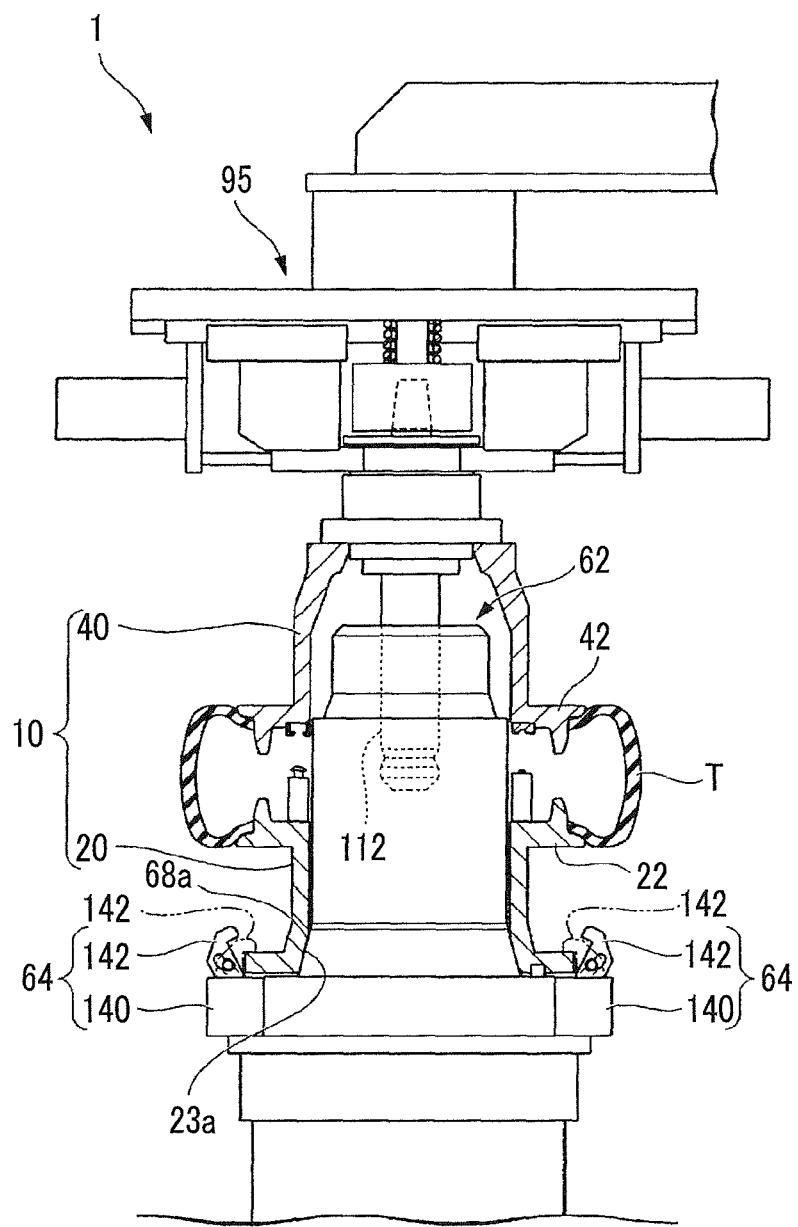
FIG. 29 is a view illustrating an operation of mounting a tire on the rim assembly for measurement.

On the other hand, in a case of exchanging the rim assembly 10 with a different type because the inside diameter or width of the tire T is changed or the like, there is a need to release the clamping of the lower rim 20. That is, the air W is discharged from the cylinder 150 by opening the closing member 139 (see FIG. 20) so that, as illustrated in FIG. 29, the hook 142 is operated as described above and the fixing mechanism 64 enters the released state (the solid line of FIG. 29). Therefore, the lower rim 20 is opened from above the apparatus side inclined surface 68a. Accordingly, the rim assembly 10 including the lower rim 20 and the upper rim 40 can be exchanged.

As described above, according to the tire holding apparatus 1 of this embodiment, the air W can be introduced into the fixing mechanism 64 by using the air supply source 73 which supplies the air W to the tire T as it is. In addition, the lower rim 20 can be reliably clamped by the fixing mechanism 64 during the measurement.

That is, by using the air supply source 73 and the ventilation hole 69a which are already provided in the rotation system, there is no need to additionally provide equipment for operating the fixing mechanism 64 in the rotation system. Moreover, since the air W is also supplied to the fixing mechanism 64 as the air W is supplied to the tire T, the lower rim 20 can be reliably clamped during the measurement.

When the measurement of the tire T is ended and the tire T is detached by moving the upper rim 40 so as to be separated from the lower rim 20 by the rim elevator 95, there may be a case where the tire T is adhered to the lower rim 20 and thus the lower rim 20 is pulled upward. However, in the tire holding apparatus 1 of this embodiment, since the fixing mechanism 64 can maintain the fixed state even after the measurement and can enter the released state by opening the closing member 139 as necessary, the tire T may be easily detached after the measurement.

Therefore, without a special equipment, it is possible to achieve the automation of the clamping of the lower rim 20 with a simple configuration, and thus an increase in the efficiency of the operation of exchanging the rim assemblies 10 for measuring various types of tires T can be achieved.

Next, a tire holding apparatus 201 according to a second embodiment of the present invention will be described.

Like elements as those of the first embodiment are denoted by like reference numerals, and the detailed description thereof will be omitted.

In this embodiment, a fixing mechanism 204 is different from that of the first embodiment.

Figure 30A:
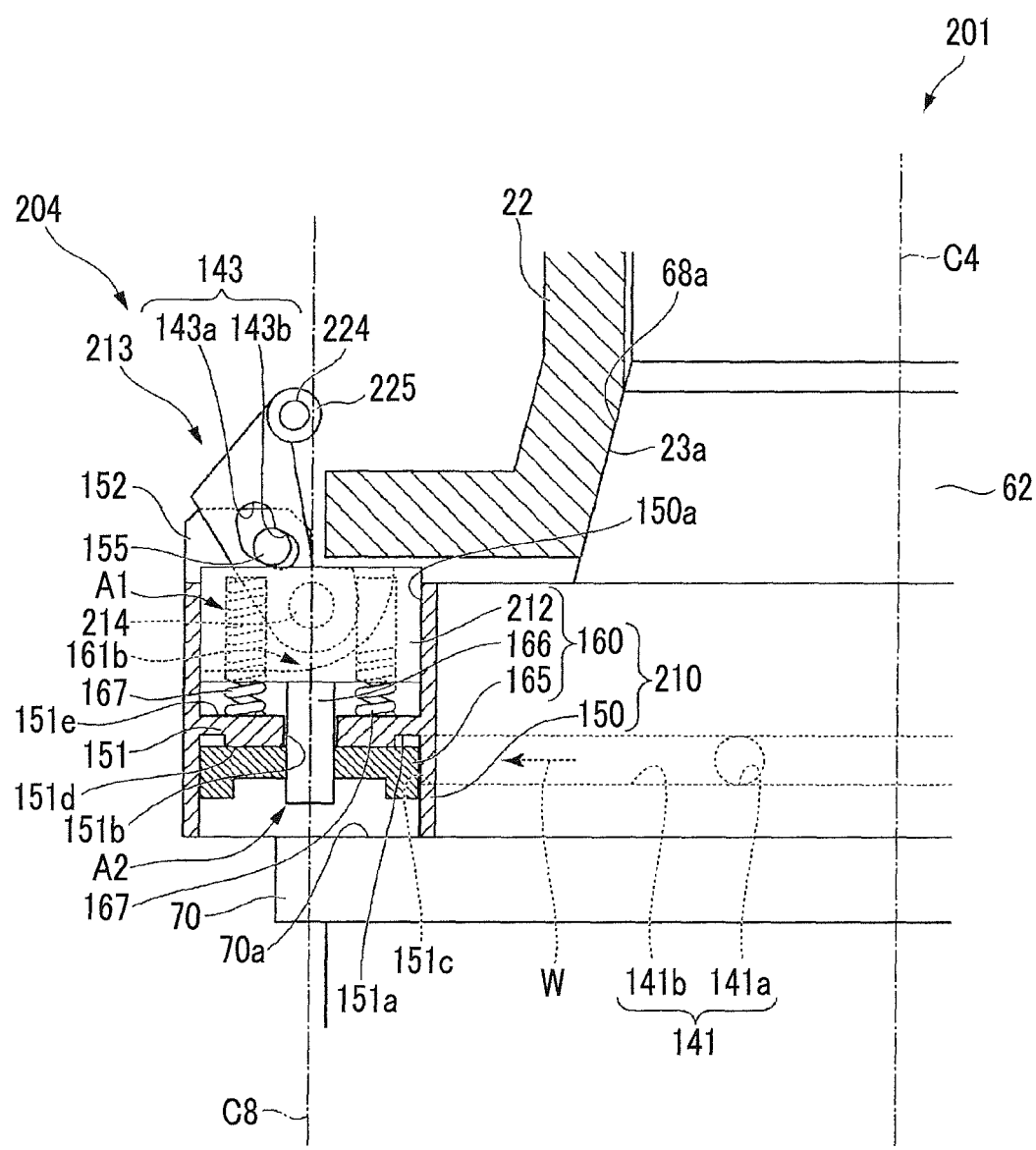
FIG. 30A is a front view of a fixing mechanism of a tire holding apparatus according to a second embodiment of the present invention, where a released state is illustrated.
Figure 30B:
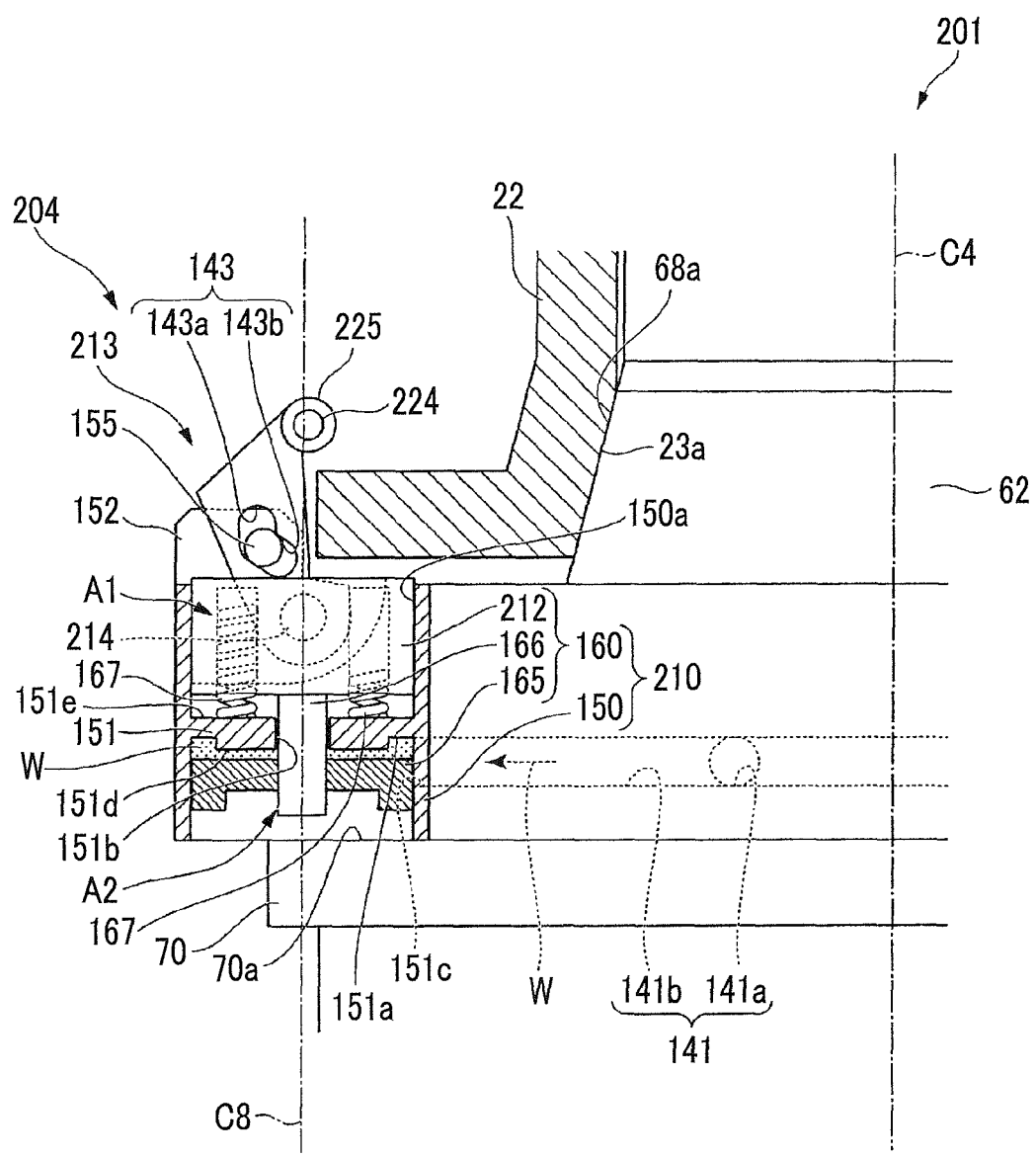
FIG. 30B is a front view of the fixing mechanism of the tire holding apparatus, where a transition from the released state to a fixed state is illustrated.
Figure 30C:
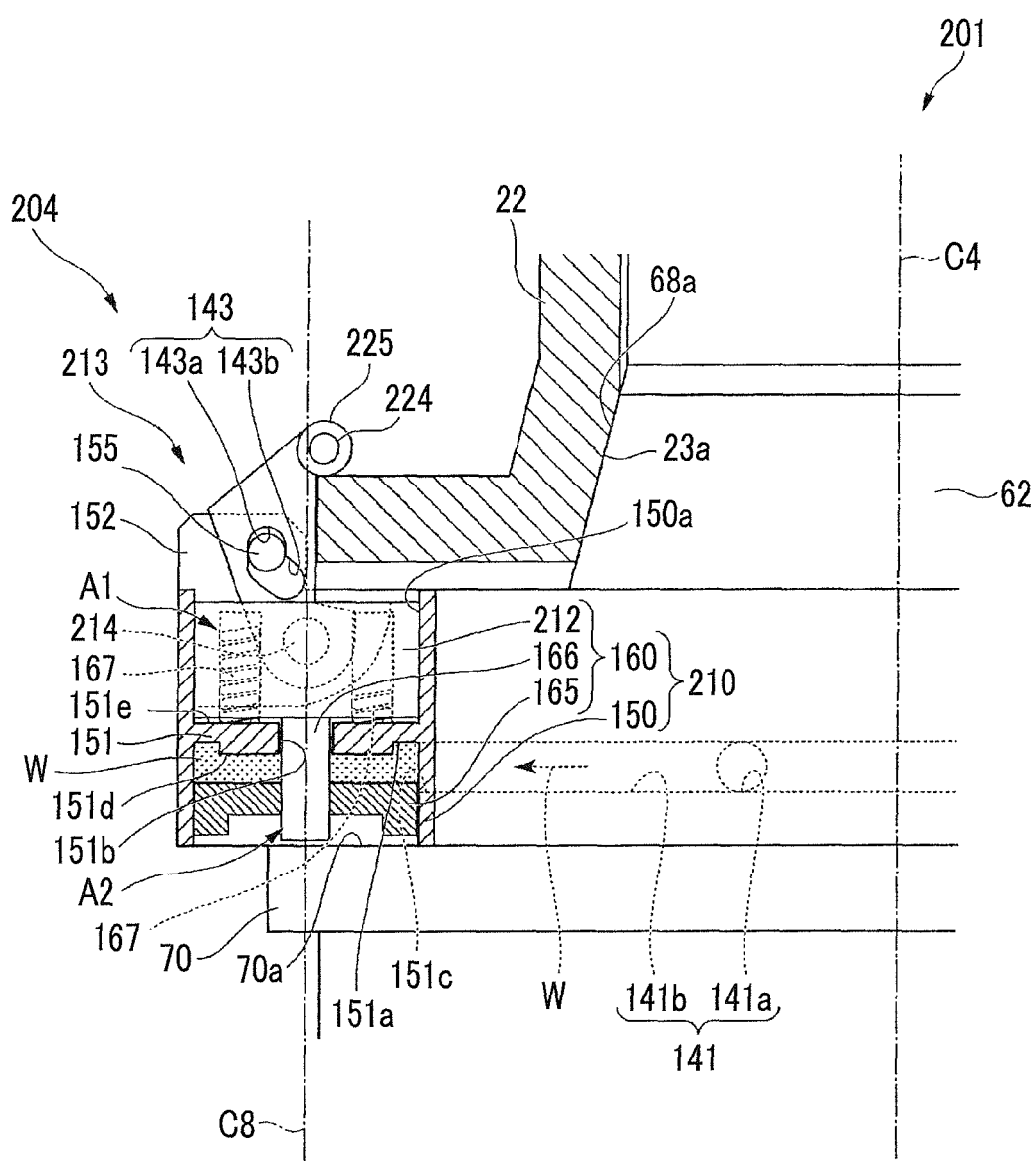
FIG. 30C is a front view of the fixing mechanism of the tire holding apparatus, where the fixed state is illustrated.

As illustrated in FIGS. 30A, 30B, and 30C, each of the fixing mechanisms 204 includes a piston 210 which is provided on the upper surface 70a of the enlarged diameter portion flange portion 70 as in the first embodiment, the drive pipe line 141, a hook 213 which is mounted on the piston 210 and is provided so as to be rotatable around an axis perpendicular to the axis C4, and the check valve 145.

The piston 210 includes the cylinder 150 having a cylindrical shape, and a piston body 211 which is accommodated in the cylinder 150.

The piston body 211 includes an upper body 212 which is disposed in the upper space A1, the lower body 165 which is disposed in the lower space A2, and the connection portion 166 which connects the upper body 212 to the lower body 165.

The upper body 212 has substantially the same configuration as that of the upper body 161 of the first embodiment, but is different in the position where a hook support pin 214 in the hook groove portion 161b is disposed. Specifically, the hook support pin 214 is disposed so that the center axis of the piston body 211 (the center axis C8 of the cylinder 150) intersects the center axis of the hook support pin 214. That is, the hook support pin 214 is mounted at the center position of the upper body 212 in the radial direction of the axis C4 (a direction perpendicular to the operation direction of the piston 210).

The hook 213 is mounted on the hook support pin 214 at the lower portion, and includes an engaging portion 224 which is provided in the upper end portion thereof so as to protrude toward the axis C4. In the fixed state of the fixing mechanism 204, the engaging portion 224 is engaged with the second flange portion 24 of the lower rim 20.

The engaging portion 224 includes the guide pin 155 and an engaging portion roller 225 which is rotatable around the same direction as the extending direction of the hook support pin 214 as the center of rotation, and the engaging portion roller 225 comes into contact with the second flange portion 24 in the fixed state of the fixing mechanism 204.

As described above, according to the tire holding apparatus 201 of this embodiment, since the hook support pin 214 is provided at the center position of the upper body 212, the bending moment of the hook support pin 214, which is generated by the vertical movement of the piston body 211 when the fixed state and the released state of the fixing mechanism 204 are repeated, can be suppressed.

That is, force can be efficiently transmitted from the piston body 211 to the hook 213, and the bending stress of the hook support pin 214 can be reduced, thereby improving durability.

Furthermore, for example, in a case where the spring 167 has a problem and the spring 167 does not function properly, there is concern that the fixing mechanism 204 may not be transited to the released state from the fixed state even when the air W is discharged from the cylinder 150.

In this embodiment, since the engaging portion 224 includes the engaging portion roller 225, as the air W is discharged from the cylinder 150, the hook 213 automatically rotates in a direction so as to be separated from the axis C4 while the engaging portion roller 225 rotates as in the transition states illustrated in FIGS. 30A, 30B, and 30C.

Accordingly, the fixing mechanism 204 can reliably enter the released state, and thus an increase in the efficiency of the operation of exchanging the rim assembly 10 can be achieved with a simple configuration, resulting in further improvement in reliability.

Next, a tire holding apparatus 301 according to a third embodiment of the present invention will be described.

Like elements as those of the first embodiment and the second embodiment are denoted by like reference numerals, and the detailed description thereof will be omitted.

In this embodiment, a fixing mechanism 304 is different from those of the first and second embodiments.

The fixing mechanism 304 further includes an opening mechanism (opening portion) 305 which discharges the air W in the cylinder 150, in addition to the fixing mechanism 64 (204) of the first embodiment or the second embodiment.

Figure 31:
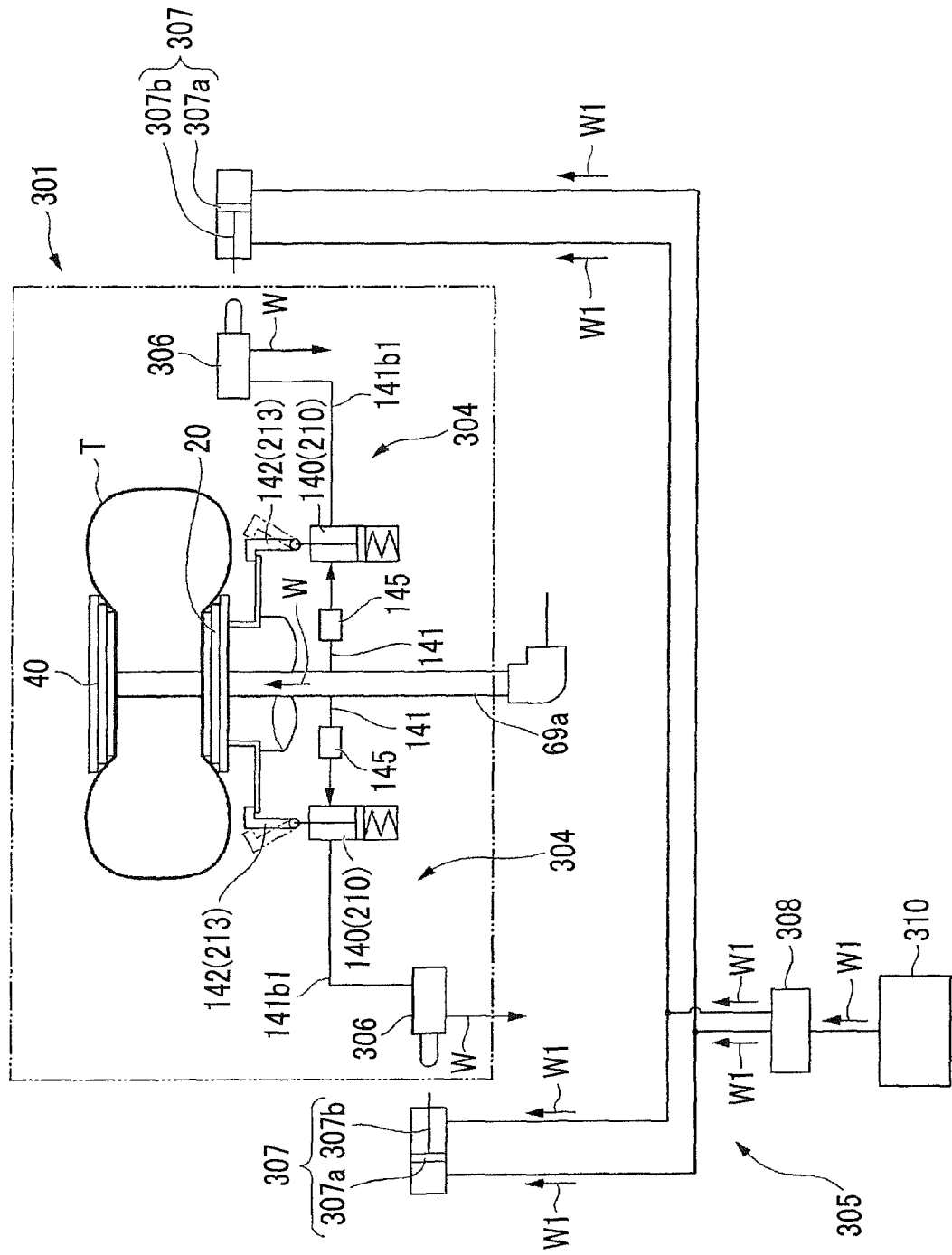
FIG. 31 is a view schematically illustrating a tire holding apparatus according to a third embodiment of the present invention.

As illustrated in FIG. 31, the opening mechanism 305 includes an opening button 306 which is provided in the exhaust flow passage 141$b$1, an actuator (drive portion) 307 which operates the opening button 306, and an electromagnetic valve (opening valve) 308 which introduces the air W into the actuator 307.

The opening button 306 opens the exhaust flow passage 141$b$1, for example, by being pressed down so as to discharge the air W to the outside. That is, in this embodiment, instead of the closing member 139, the opening button 306 is provided in the exhaust flow passage 141$b$1.

The actuator 307 includes a piston 307$a$ which can be operated linearly by hydraulic pressure or pneumatic pressure. A rod 307$b$ is mounted on the piston 307$a$ so as to be directed to the pressing direction of the opening button 306, and thus the opening button 306 can be pressed down according to the operation of the piston 307$a$.

The electromagnetic valve 308 is a valve device which introduces and stops introducing a medium (air or oil) W1 from a working medium supply portion 310, which is provided in the outside of the tire holding apparatus 301, to the actuator 307. The electromagnetic valve 308 may be operated by being manually supplied with power, and a controller or the like which electrically detects the end of the measurement and supplies power to the electromagnetic valve 308 may be used.

As described above, according to the tire holding apparatus 301 of this embodiment, when the rim assembly 10 is exchanged after finishing the measurement, a timing to release the fixing mechanism 304 can be selected by the decision of a worker. Furthermore, such an operation can be automatically performed, thereby increasing the efficiency of the operation.

While the exemplary embodiments of the present invention have been described, the present invention is not limited to the embodiments. Additions, omissions, substitutions, and other modifications of configurations can be made without departing from the spirit of the invention. The present invention is not limited by the above description, and is limited only by the appended claims.

For example, in the above-described embodiments, when the air W is supplied between the rims 20 and 40 by the air supply source 73 while the tire T is mounted between the rims 20 and 40, a force is applied by the pressure of the air W to separate the rims 20 and 40 from each other and thus the rim side inclined surface 23$a$ is pressed against the apparatus side inclined surface 68$a$. Accordingly, the friction between the apparatus side inclined surface 68$a$ and the rim side inclined surface 23$a$ is increased, and thus the lower rim 20 is reliably supported by the apparatus side inclined surface 68$a$. However, since the lower rim 20 can be reliably fixed by the fixing mechanism 64, 204, or 304, the apparatus side inclined surface 68$a$ and the rim side inclined surface 23$a$ may not necessarily be provided. That is, the lower rim 20 may be clamped by using the upper surface 69$c$ of the enlarged diameter portion 69 as the support surface.

In addition, the lower rim 20 is fixed by the fixing mechanism 64, 204, or 304 in the description. However, the fixing mechanisms 64, 204, and 304 may also be provided so as to fix the upper rim 40, or to fix both the lower rim 20 and the upper rim 40.

In the above-described embodiments, the tire holding apparatuses 1, 201, and 301 are the tire uniformity measuring apparatuses, but may be other testing apparatuses such as a tire balance measuring apparatus without being limited thereto. In addition, the tire holding apparatuses 1, 201, and 301 may also be applied to other tire holding apparatuses such as a post-cure inflator which cools and molds a vulcanized tire T.

INDUSTRIAL APPLICABILITY

The present invention relates to a tire holding apparatus on which a tire is mounted to be tested or molded. According to the tire holding apparatus of the present invention, by employing a fixing mechanism (clamping portion) which uses the pressure of air (inflation gas) as a drive force, the clamp of a rim can be clamped with a simple structure.

REFERENCE SIGNS LIST

1 tire holding apparatus
10 rim assembly 20 lower rim (rim)
21 body
21a one end portion
21b the other end portion
22 flange portion
22a principal surface
23 lower through-hole
23a rim side inclined surface
24 second flange portion
24a principal surface
24b positioning hole portion
27 pin
28 stand
28a tip end surface
28b protrusion
29 groove portion
29a side surface on tip end side
29b side surface on base end side
30 protrusion
40 upper rim
41 body
41a one end portion
42 flange portion
42a principal surface
43 upper through-hole
46 pin receiving portion
47 stand receiving portion
47a tip end surface
48 insertion opening
49 sliding opening
50 wall portion
51 protrusion
51a concave groove
54 concave portion
55 guide concave portion
60 body unit (body section)
61 base (support portion)
62 lower spindle (rotating body)
63 elevating mechanism
64 fixing mechanism (clamping portion)
67 cylindrical portion
67a outer peripheral surface
67b large diameter portion
67c small diameter portion
68 tapered portion
68a apparatus side inclined surface (support surface)
69 enlarged diameter portion
69a ventilation hole (inflation flow passage)
69b positioning convex portion
69c upper surface
70 enlarged diameter portion flange portion
70a upper surface
72 hole portion
72a opening
73 air supply source (inflation gas supply portion)
76 engaging mechanism
77 tapered sleeve
78 hook operating rod
79 body
79a through-hole
79b side wall
79c slit
80 flange portion
83 cylindrical portion
83a annular groove
83b long hole
83c cutout
84 shaft-like member
87 hook
87a engaging claw
88 pin
89 spring
90 servomotor
93 frame
94 ball screw
95 rim elevator
96 positioning portion
97 chuck portion
100 support plate
100a through-hole
101 rod
102 positioning member
102a second apparatus side inclined surface
103 support member
104 spring
106 air cylinder
107 gripping member
110 connection adaptor
111 adaptor body
111a second rim side inclined surface
111b engaging groove
112 upper rim shaft
112a engaging concave portion
123 rail
124 load wheel
130 rim exchanging unit
131 turning base
132 rail
133 turning shaft
134 stocker frame
135 rim pedestal
139 closing member (opening portion)
140 piston
141 drive pipe line
141a annular flow passage
141b branch flow passage
141b1 exhaust flow passage
142 hook
143 guide hole
143a first long hole
143b second long hole
144 engaging portion
145 check valve
150 cylinder
150a inner peripheral surface
151 partitioning plate
151a annular concave portion
151b through-hole
151c communication hole
151d lower surface
151e upper surface
152 guide pin support portion
155 guide pin
160 piston body
161 upper body
161a spring insertion portion
161a1 upper end surface
161b hook groove portion
161b1 bottom surface
161c lower surface
161d upper surface
162 hook support pin
165 lower body
166 connection portion 167 spring
S1 first reference plane
S2 second reference plane
E1 small gap
C1 axis
C2 axis
C4 axis
C6 axis
C7 axis
C8 center line
W air (inflation gas)
A1 upper space
A2 lower space
201 tire holding apparatus
204 fixing mechanism
210 piston
211 piston body
212 upper body
213 hook
214 hook support pin
224 engaging portion
225 engaging portion roller
301 tire holding apparatus
304 fixing mechanism
305 opening mechanism (opening portion)
306 opening button
307 actuator (drive portion)
307a piston
307b rod
308 electromagnetic valve (opening valve)
310 working medium supply portion
W1 medium

The invention claimed is:

1. A tire holding apparatus comprising:
an annular rim of a rim assembly which is detachably mounted;
a body section having a support surface which supports the rim;
an inflation gas supply portion which has an inflation flow passage that passes from an inner portion of the body section to a center portion of the rim supported by the support surface and supplies inflation gas into a tire supported by the rim; and
a clamping portion which is mounted on the body section and clamps the rim to the support surface of the body section by using pressure of the inflation gas that flows through the inflation flow passage as a drive force,
wherein the clamping portion includes:
a piston which is mounted on the body section and is driven by the inflation gas;
a hook which is mounted on the piston and clamps the rim to the support surface by pressing the rim against the support surface according to an operation of the piston;
a drive pipe line which connects the piston to the inflation flow passage; and
a check valve which is provided in the drive pipe line and prevents the inflation gas from flowing backward from the piston to the inflation flow passage.

2. The tire holding apparatus according to claim 1,
wherein the body section includes a rotating body that is provided with the support surface and rotates around a center axis and a support portion which supports the rotating body so as to be rotatable, and
the clamping portion is mounted on the rotating body.

3. The tire holding apparatus according to claim 1, wherein the clamping portion includes an opening portion which opens an inner portion of the piston so that the inflation gas filling the piston can be discharged.

4. The tire holding apparatus according to claim 3, wherein the opening portion includes an opening valve and a drive portion which drives the opening valve.

5. The tire holding apparatus according to claim 1, wherein the hook is mounted on a center portion in a direction perpendicular to an operation direction of the piston.

6. The tire holding apparatus according to claim 1, wherein the hook includes a roller at a position where the rim is pressed, and
the roller is rotatable around a direction perpendicular to a direction in which the rim is pressed against the support surface.

* * * * *